(12) United States Patent
Panzarella et al.

(10) Patent No.: US 7,377,740 B2
(45) Date of Patent: May 27, 2008

(54) LIFTING DEVICE FOR A PERSONAL-TRANSPORTATION VEHICLE

(75) Inventors: Thomas A. Panzarella, Harleysville, PA (US); David D. McClanahan, Harleysville, PA (US)

(73) Assignee: Cook Technologies, Inc., Green Lane, PA (US)

( * ) Notice: Subject to any disclaimer, the term of this patent is extended or adjusted under 35 U.S.C. 154(b) by 435 days.

(21) Appl. No.: 10/830,252

(22) Filed: Apr. 22, 2004

(65) Prior Publication Data

US 2006/0062661 A1    Mar. 23, 2006

Related U.S. Application Data

(60) Provisional application No. 60/464,931, filed on Apr. 22, 2003.

(51) Int. Cl.
     *B60P 1/54*        (2006.01)
(52) U.S. Cl. ............... 414/543; 414/462; 414/542; 414/921; 212/180; 212/347; 254/265; 254/279; 254/292
(58) Field of Classification Search ............ 414/543, 414/542, 921, 462, 465, 466; 192/69.62; 403/109.6; 212/347, 180; 254/265, 279, 254/292
See application file for complete search history.

(56) References Cited

U.S. PATENT DOCUMENTS

| | | | | |
|---|---|---|---|---|
| 796,205 | A | * | 8/1905 | Graham et al. ......... 192/69.62 |
| 2,013,233 | A | * | 9/1935 | Buckner ................. 239/745 |
| 2,446,488 | A | * | 8/1948 | Pierce .................... 414/543 |
| 2,910,190 | A | * | 10/1959 | Baas ...................... 212/347 |
| 3,671,015 | A | * | 6/1972 | Sullivan ................. 254/332 |
| 3,711,877 | A | | 1/1973 | Averill ................... 5/81 |
| 3,821,904 | A | * | 7/1974 | Fowler .................. 74/142 |
| 3,945,738 | A | * | 3/1976 | Bahnsen ................ 403/109.4 |
| 4,111,316 | A | | 9/1978 | Wappler ................ 414/550 |

(Continued)

FOREIGN PATENT DOCUMENTS

EP      0425 733 A1     5/1991

OTHER PUBLICATIONS

Manual: Bruno Curb-Sider®, Bruno Model SL-600, Bruno Independent Living Aids, Inc. 1999, 2 pages.

(Continued)

*Primary Examiner*—Saul J. Rodriguez
*Assistant Examiner*—Michael S. Lowe
(74) *Attorney, Agent, or Firm*—Synnestvedt & Lechner LLP

(57) ABSTRACT

A preferred embodiment of a lifting device includes a mounting column having a first major portion extending in a first direction, and a second major portion fixedly coupled to the first major portion and extending in a second direction. The lifting device also comprises a lifting arm rotatably mounted on the second major portion of the mounting column and having a first hole formed therein for receiving a pin, a bracket fixedly coupled to the second portion of the mounting column and having a second hole formed therein for receiving the pin so that the pin restrains the lifting arm from substantial rotation about the second major portion of the mounting column, and a retaining member secured to the second major portion of the mounting column so that the bracket and the retaining member restrain the lifting arm from substantial movement in the second direction.

7 Claims, 33 Drawing Sheets

U.S. PATENT DOCUMENTS

| | | | | |
|---|---|---|---|---|
| 4,419,038 | A | 12/1983 | Pendergraft | 414/543 |
| 4,463,858 | A | 8/1984 | Bilas | 212/176 |
| 4,508,233 | A * | 4/1985 | Helms | 212/294 |
| 4,595,108 | A * | 6/1986 | Koizumi et al. | 212/347 |
| 4,991,810 | A * | 2/1991 | Andrus et al. | 248/286.1 |
| 5,090,580 | A | 2/1992 | Nelson | 414/467 |
| 5,156,517 | A | 10/1992 | Boissonneault | 414/467 |
| 5,195,726 | A | 3/1993 | Kaner | 254/325 |
| 5,431,526 | A * | 7/1995 | Peterson et al. | 414/543 |
| 5,752,799 | A | 5/1998 | Carey et al. | 414/543 |
| 5,810,547 | A * | 9/1998 | Bruno et al. | 414/543 |
| 5,853,282 | A * | 12/1998 | Bechler et al. | 414/543 |
| 6,202,868 | B1 | 3/2001 | Murray | 212/294 |
| 6,460,908 | B1 | 10/2002 | Green | 293/117 |
| 6,499,610 | B2 | 12/2002 | Spitsbergen | 212/179 |
| 6,547,507 | B1 * | 4/2003 | Gest et al. | 414/543 |
| 2001/0038789 | A1 * | 11/2001 | Espanel et al. | 414/680 |
| 2002/0074305 | A1 | 6/2002 | Davis et al. | 212/180 |
| 2003/0126772 | A1 * | 7/2003 | Masumoto et al. | 37/466 |
| 2005/0035338 | A1 * | 2/2005 | Panzarella et al. | 254/390 |

OTHER PUBLICATIONS

Manual: Bruno Curb-Sider® Super XL, Bruno Model VSL-670, Bruno Independent Living Aids, Inc. 1999, 2 pages.

Installation Manual:VSL-600 Curb Sider® VSL-670 Curb Sider SXL®, Bruno Independent Living Aids, Dec. 6, 1999, 36 pages.

Operators Manual: VSL-6000 Curb Sider® and VSL-670 Curb Sider SXL®, Bruno Independent Living Aids, Oct. 19, 1999, 40 pages.

Trade Manual: HomeCareXtra Rehab/Mobility Focus, vol. III, Issue 3, 1999, 32 pages.

\* cited by examiner

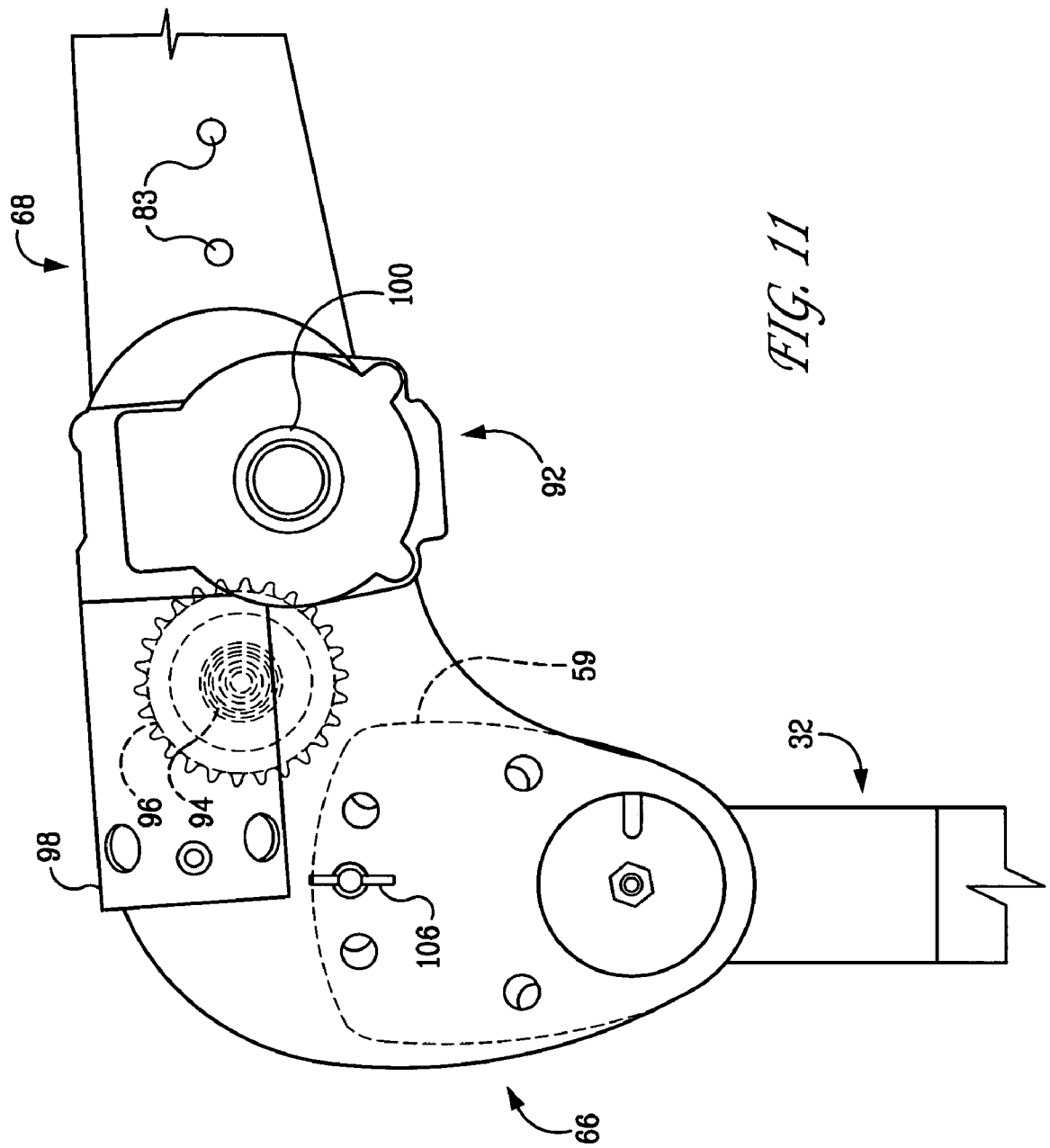

LIFTING DEVICE FOR A PERSONAL-TRANSPORTATION VEHICLE

CROSS REFERENCE TO RELATED APPLICATIONS

This application is based on provisional application No. 60/464,931 filed Apr. 22, 2003, the entirely of which is incorporated herein by reference.

FIELD OF THE INVENTION

The present invention relates generally to a device for lifting a personal transportation vehicle such as a motorized wheelchair or scooter. The lifting device and be used, for example, to position the personal transportation vehicle within a larger vehicle such as a van or pickup truck.

BACKGROUND OF THE INVENTION

Personal transportation vehicles such as motorized wheelchairs or scooters are commonly used by persons having ambulatory difficulties or other disabilities. Personal transportation vehicles are often transported in a van, pickup truck, or other suitable transporting vehicle (hereinafter referred to as "the transporting vehicle"). Although compact, personal transportation vehicles can weigh several hundred pounds. Thus, some type of lifting device is usually required to load the personal transportation vehicle onto and off of the transporting vehicle.

A typical lifting device may include a horizontally-oriented arm having a retractable strap extending therefrom for lifting the personal transportation vehicle. Some types of arms may telescope to increase the overall length of the arm, thereby permitting the end of the arm to be located directly over the center of gravity of the personal transportation vehicle during lifting.

The lifting arm is commonly supported by a vertically-oriented column. The column can be rotatably coupled to a base secured to the floor of the transporting vehicle. Rotation of the column in relation to the base permits the arm (and the personal transportation vehicle) to be swung into (and out of) the interior or the bed of the transporting vehicle once the personal transportation vehicle has been lifted to an appropriate height.

Conventional arm-type lifting devices, in general, must be configured by the manufacturer or installer for a left or right hand installation, i.e., for installation on a particular side of the transporting vehicle. Hence, additional parts must often be designed, manufactured, and provided with the lifting device to facilitate the possibility of both left and right-hand installations. Moreover, reconfiguring the lifting device between left and right hand configurations may require that the device be returned to the dealer or other location where trained service personnel and appropriate tooling are located.

The bases of conventional arm-type lifting devices are often bulky, and may by subject to interference with the wheel well or other structure of the transporting vehicle. Also, most lifting arms cannot easily be moved to a vertically-oriented position (for compact storage when a personal-transportation vehicle is not being carried in the transporting vehicle). Moreover, the telescoping arms used on some lifting devices are bulky, and may extend only a relatively small distance in relation to the overall length of the arm due to the structural characteristics of the telescoping configuration.

SUMMARY OF THE INVENTION

A preferred embodiment of a lifting device comprises a base. The lifting device also comprises a mounting column having a first major portion rotatably coupled to the base and extending in a first direction, and a second major portion fixedly coupled to the first major portion and extending in a second direction substantially perpendicular to the first direction. The lifting device further comprises a lifting arm rotatably mounted on the second major portion of the mounting column and having a first hole formed therein for receiving a pin.

The lifting device also comprises a bracket fixedly coupled to the second portion of the mounting column and having a second hole formed therein for receiving the pin when the first and second holes are substantially aligned so that the pin restrains the lifting arm from substantial rotation about the second major portion of the mounting column. The lifting device further comprises a retaining member secured to the second major portion of the mounting column so that the bracket and the retaining member restrain the lifting arm from substantial movement in the second direction.

BRIEF DESCRIPTION OF THE DRAWINGS

For the purpose of illustrating the invention, the drawings show an embodiment that is presently preferred. The invention is not limited, however, to the specific instrumentalities disclosed in the drawings. In the drawings:

FIG. 11 is a side view of a portion of a lifting arm assembly of the lifting device shown in FIGS. 1-5;

DESCRIPTION OF PREFERRED EMBODIMENTS

Figure 1:
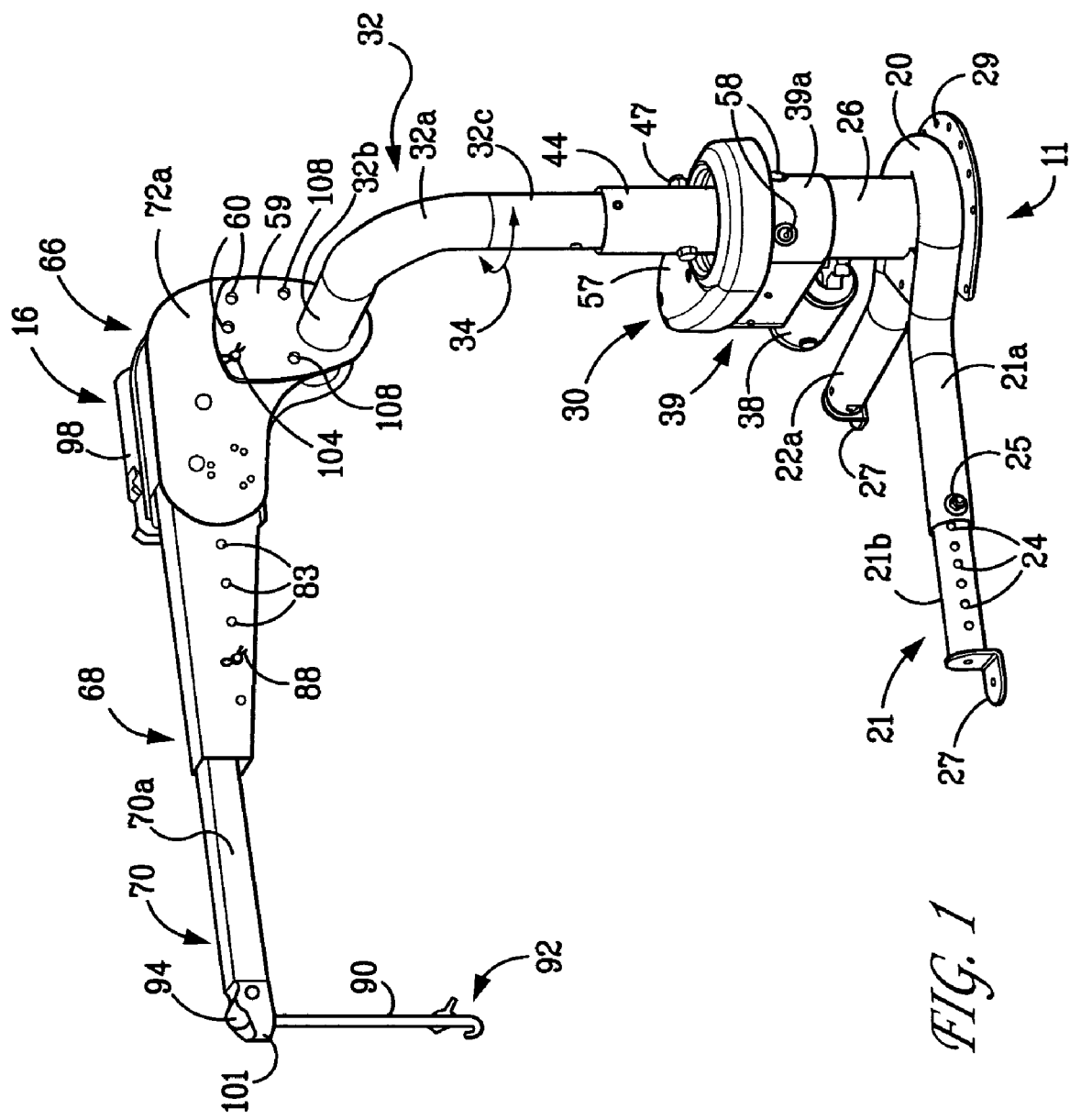
FIG. 1 is a perspective view of a preferred embodiment of a lifting device for a personal transportation vehicle, configured for a right-hand installation.

A preferred embodiment of a lifting device 10 is depicted in FIGS. 1 to 11. The lifting device 10 can be used in conjunction with a personal transportation vehicle such as a motorized wheelchair or scooter. More particularly, the lifting device 10 can be used to lift a personal transportation vehicle into a larger vehicle, such as a van, pickup truck, or automobile, so that the personal transportation device can be transported from one location to another. (The vehicle used to transport the personal transportation device is hereinafter referred to as "the transporting vehicle.")

The lifting device 10 comprises a base assembly 11, a mounting column assembly 14, and a lifting arm assembly 16 (see FIGS. 1-5). The lifting arm assembly 16 is used to lift the personal transportation vehicle onto or off of the transporting vehicle. The mounting column assembly 14 is used to support the lifting arm assembly 16, and the base assembly 11 is used to mount the lifting device 10 on the transporting vehicle.

The base assembly 11 comprises an intermediate portion 20, and a first leg 21 that extends from a first end of the intermediate portion 20 in a first direction. The base assembly 11 also includes a second leg 22 that extends from an opposing second end of the intermediate portion 20 in a second direction. Preferably, the first and second directions are substantially perpendicular. The intermediate portion 20 and the first and second legs 21, 22 each preferably have a substantially circular cross section.

The intermediate portion 20 is fixedly coupled to a first collar 26 of the mounting column assembly 14. Preferably, the intermediate portion 20 is substantially C-shaped or U-shaped. This feature can potentially provide greater clearance between the first and second legs 21, 22 and the adjacent structure of the transporting vehicle, in comparison to an intermediate portion having a shape approximating a quarter circle. Moreover, this particular configuration for the base assembly 11 is interchangeable between left-hand and right hand installations. (The terms "left-hand installation" and "right-hand installation," as used herein, refer to installations of the lifting device 10 on or near the respective left and right sides of the transporting vehicle.)

Figure 18:
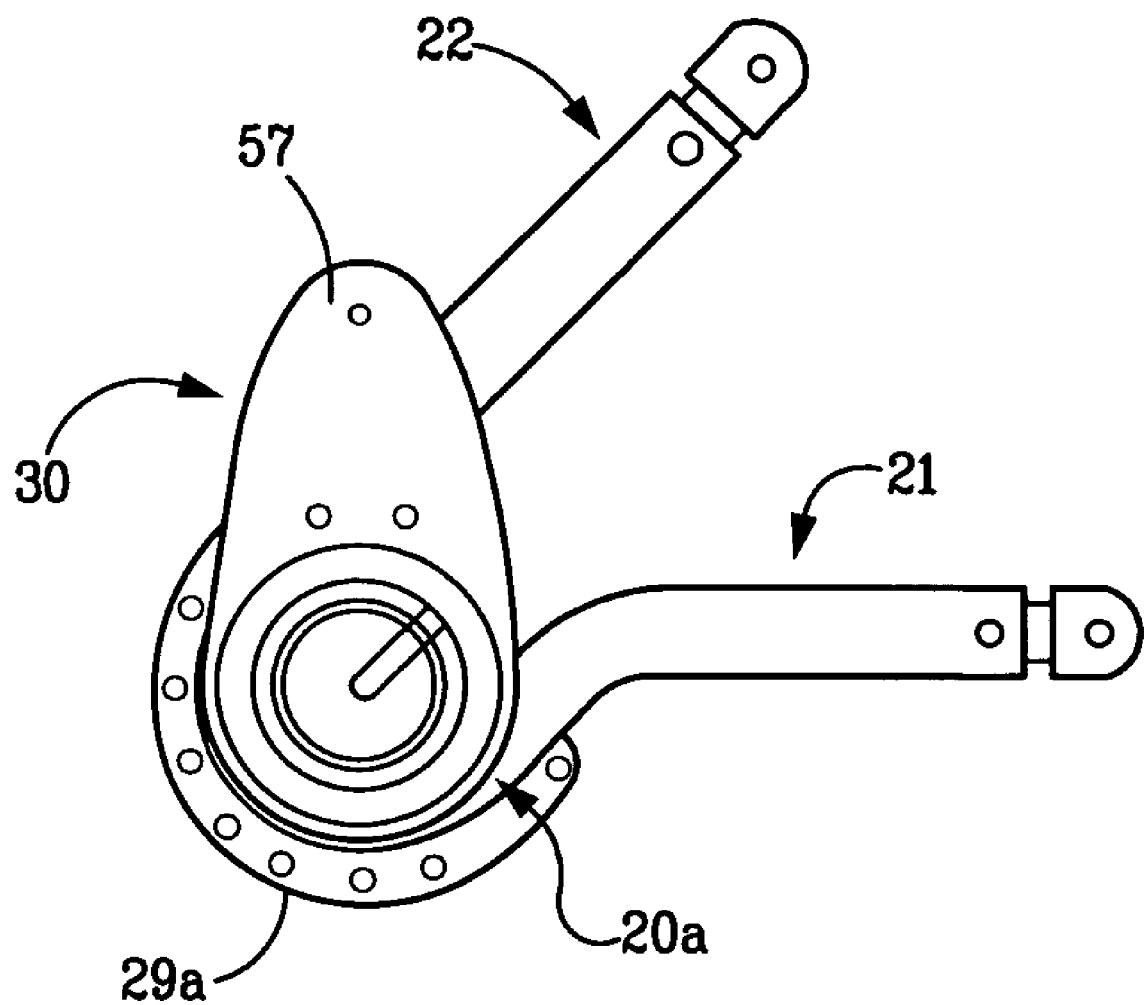
FIG. 18 is a top view of the drive assembly shown in FIGS. 7, 8, 10A, and 10B, and an alternative embodiment of the base assembly shown in FIGS. 10A and 10B.
Figure 19:
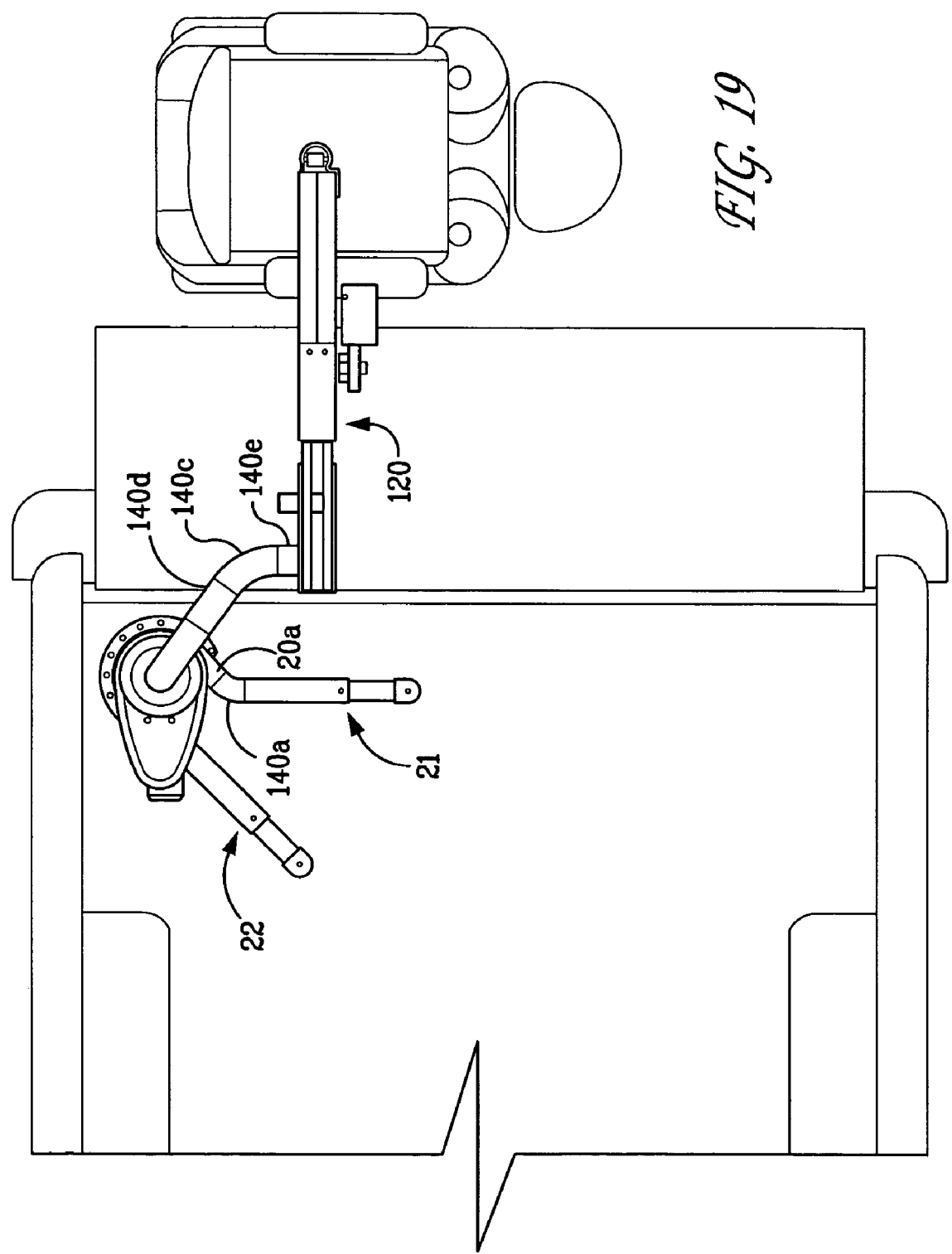
FIG. 19 is a top view of an alternative embodiment of a mounting arm of the lifting device shown in FIGS. 1-5, and the base assembly shown in FIG. 18.

It should be noted that alternative embodiments of the base assembly 11 can be equipped with an intermediate portion 20a having a shape that causes the first and second legs 21, 22 to extend at a relative angle of less than ninety degrees (see FIGS. 18 and 19). This configuration can be used in installations where additional clearance is required to accommodate an obstruction in the transporting vehicle such as a wheel well. (The first and second legs 21, 22 are depicted in FIGS. 18 and 19 as being angled at approximately 45 degrees; the first and second legs 21, 22 can be angled at other values as required by a particular application.)

Figure 6:
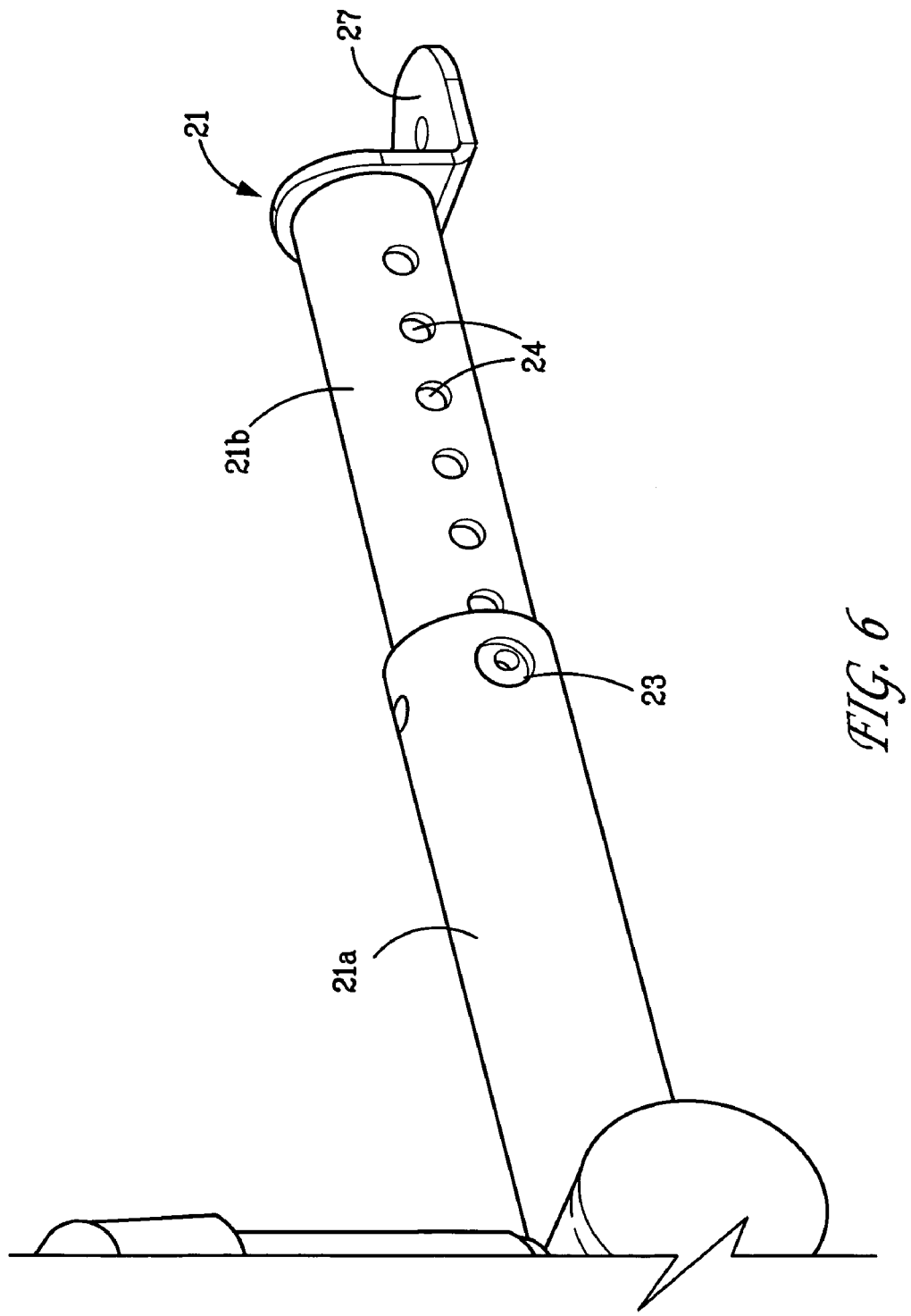
FIG. 6 is a perspective view of a leg of a base assembly of the lifting device shown in FIGS. 1-5.

The first leg 21 preferably comprises a first portion 21a, and a second portion 21b telescopically disposed within the first portion 21a (see FIG. 6). The first portion 21a preferably has two diametrically opposed holes 23 formed therein, and the second portion 21b preferably has a plurality of holes 24 formed therein. Each of the holes 24 diametrically opposes one of the other holes 24. The opposing pairs of holes 24 are spaced apart along a portion of the length of the second portion 21b.

The holes 23, 24 facilitate adjustment of the overall length of the first leg 21. In particular, the second portion 21b can be moved into or out of the first portion 21a so as to align the holes 23 with a corresponding pair of the holes 24 when the overall length of the first leg 21 is at or near a desired value. A conventional fastener 25 can be inserted through the aligned holes 23, 24 to secure the second portion 21b in position relative to the first portion 21a.

The fastener 25 preferably comprises a bolt 25a, a washer 25b, and a nut 25c that mates with the bolt 25a. The holes 23 each preferably have a diameter larger than a maximum diameter of the head of the bolt 25a. This features permits the head of the bolt 25a to fit within the holes 23, and to directly contact and act against the second portion 21b (see FIGS. 4 and 6). The washer 25b preferably has a diameter larger than the diameter of the holes 23. The nut 25c contacts the washer 25b and the washer 25b, in turn, contacts and acts against the first portion 21a. This feature is believed to produce a stiffer and more secure connection between the first and second portions 21a, 21b in comparison to an arrangement in which the bolt 25a and washer 25b both directly contact and act against the first portion 21a.

The second leg 22 preferably comprises a first portion 22a, and a second portion 22b telescopically disposed within the first portion 22a. The first portion 22a preferably has two of the diametrically opposed holes 23 formed therein The second portion 22b preferably has a plurality of the diametrically-opposed holes 24 formed therein that permit the overall length of the second leg 22 to be adjusted using another one of the fasteners 25, in a manner similar to that described above with respect to the first leg 21.

Figure 34:
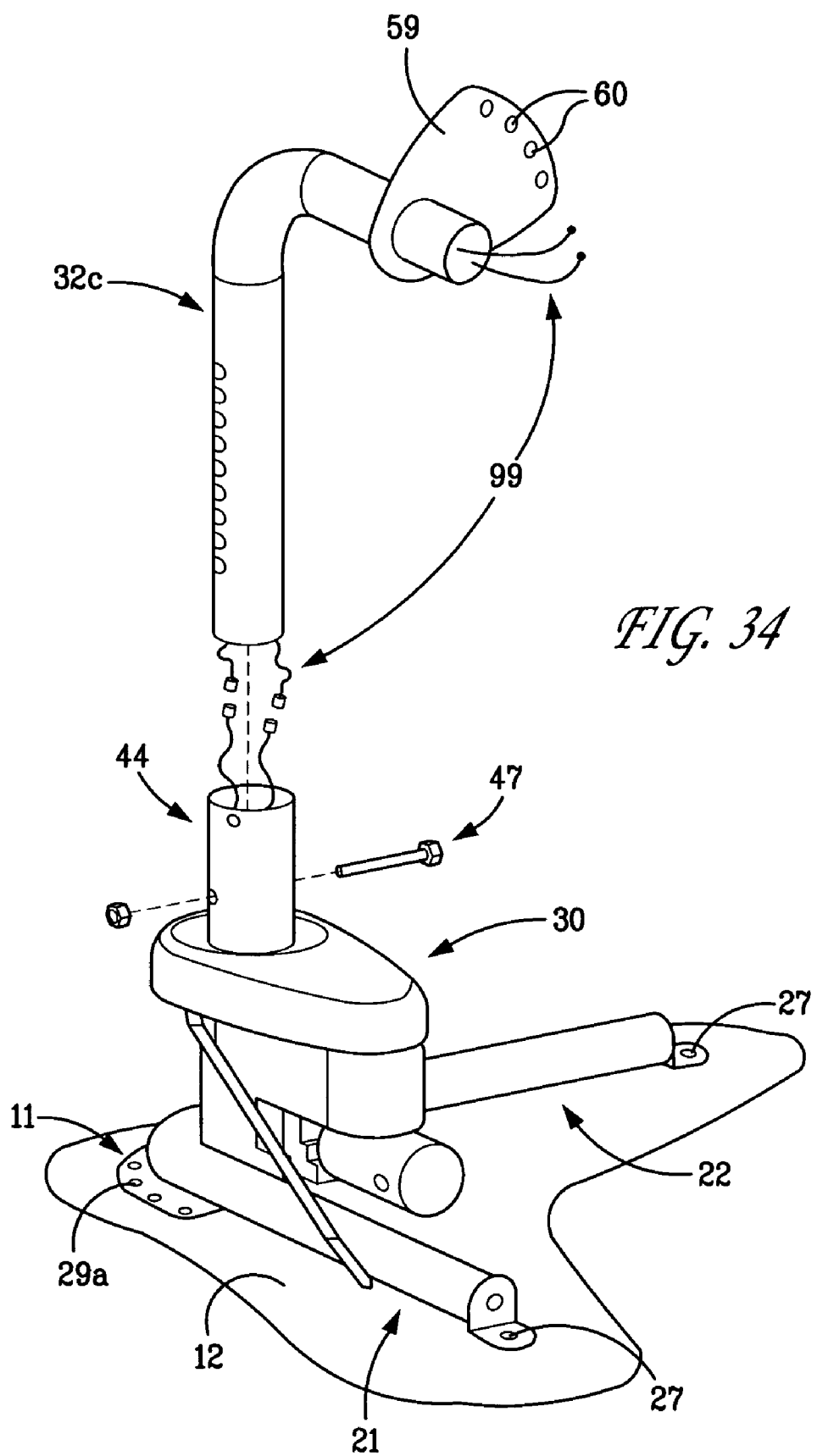
FIG. 34 is a partially-exploded perspective view of a portion of the lifting device shown in FIGS. 1-5 and 29.

The intermediate portion 20, and the second portions 21b, 22b of the respective first and second legs 21, 22 each include mounting provisions for securing the base assembly 11 to a floorboard 12 or other surface of the transporting vehicle (see FIG. 34). The mounting provisions on the second portions 21b, 22b can be, for example, flanges 27 each having a hole formed therein for receiving a conventional fastener (not shown). The mounting provision on the intermediate portion 20 can be, for example, a plate 29 having a plurality of holes formed therein for receiving a plurality of conventional fasteners (not shown).

The mounting column assembly 14 supports the lifting arm assembly 16, as noted above. The mounting column assembly 14 comprises a drive assembly 30 and a column 32. The drive assembly 30 causes the column 32 to pivot in relation to the base assembly 11. More particularly, the drive assembly 30 causes the column 32 to rotate in the directions denoted by the arrow 34 in FIGS. 1-3. Preferably, the degree of travel of the column 32 is approximately 200 degrees. This arrangement permits the lifting arm assembly 16 to rotate about the centerline of the second major portion 32c of the column 32. Hence, the lifting arm assembly 16 can be swung outwardly, i.e., toward the outside of the transporting vehicle, so that the personal transportation vehicle suspended from the lifting arm assembly 16 can be lowered to the ground.

Figure 7:
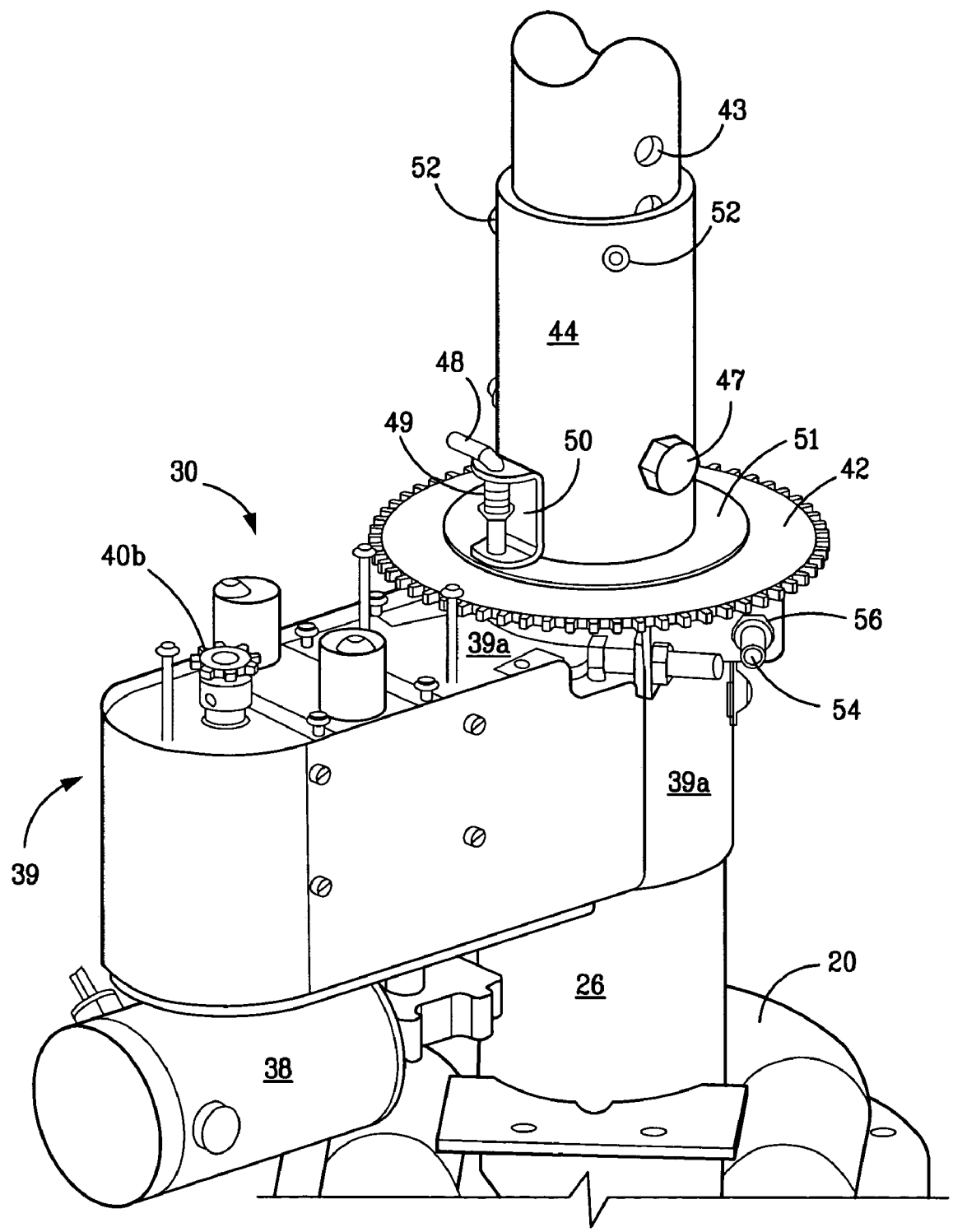
FIG. 7 is a top perspective view of a drive assembly of a mounting column assembly of the lifting device shown in FIGS. 1-5, with a cover of the drive assembly removed.
Figure 8:
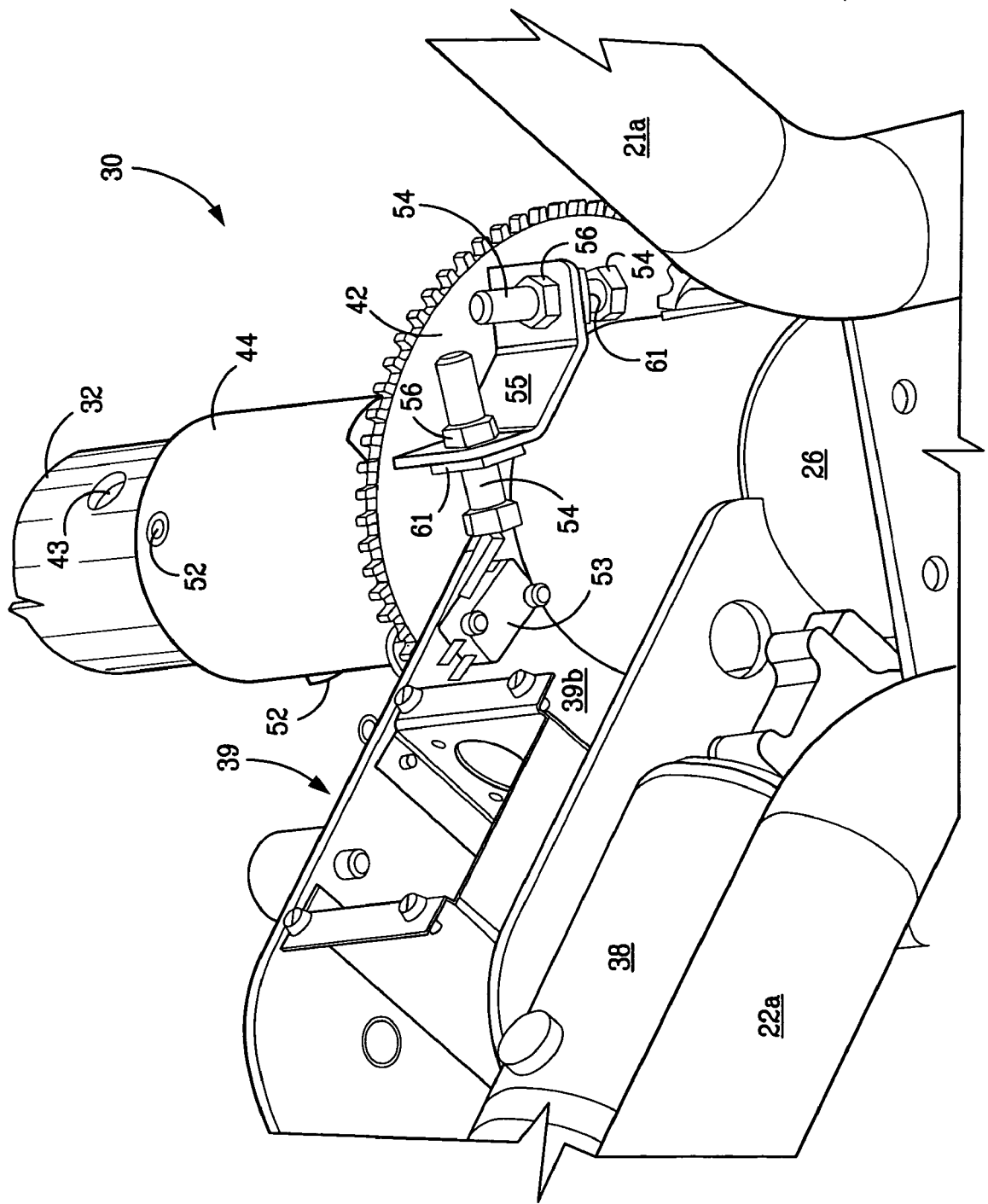
FIG. 8 is a bottom perspective view of the drive assembly shown in FIG. 7.
Figure 9:
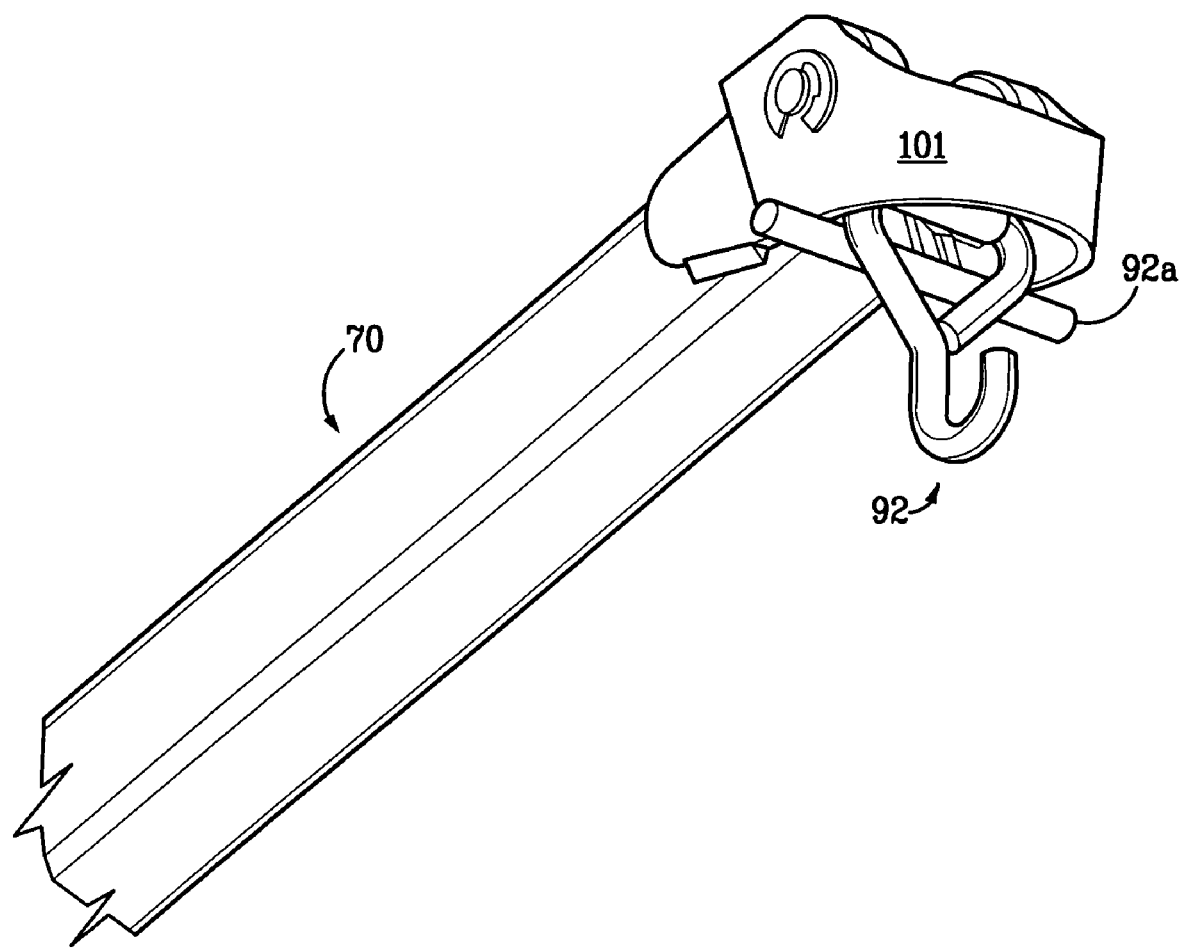
FIG. 9 is a perspective view of a portion of a boom portion, lifting strap, and lifting hook of the lifting device shown in FIGS. 1-5.
Figure 10A:
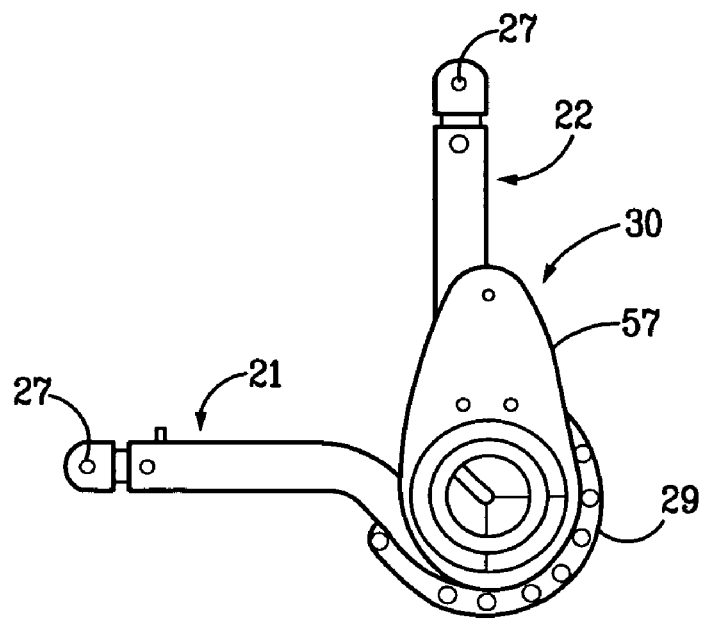
FIG. 10A is a top view of the drive assembly shown in FIGS. 7 and 8, and a base assembly of the lifting device shown in FIGS. 1-5, with the drive assembly configured for a right-hand installation.
Figure 10B:
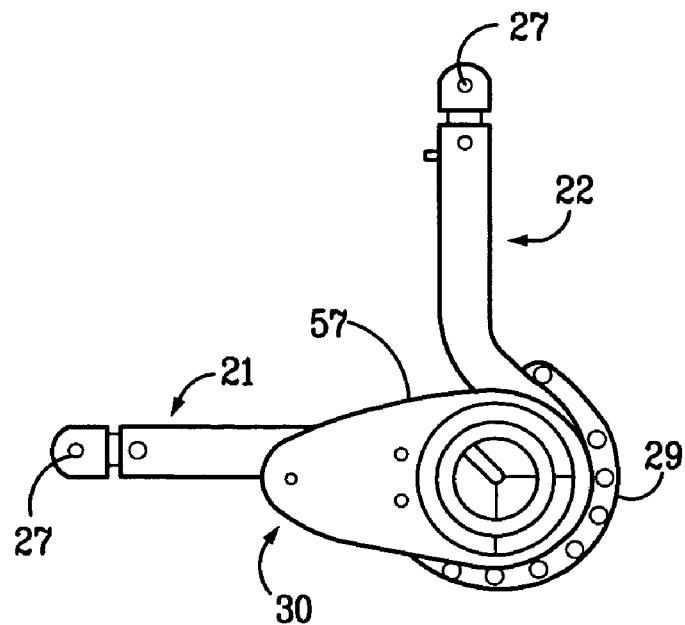
FIG. 10B is a top view of the drive assembly and base assembly shown in FIGS. 7, 8, and 10A, with the drive assembly configured for a left-hand installation.
Figure 12:
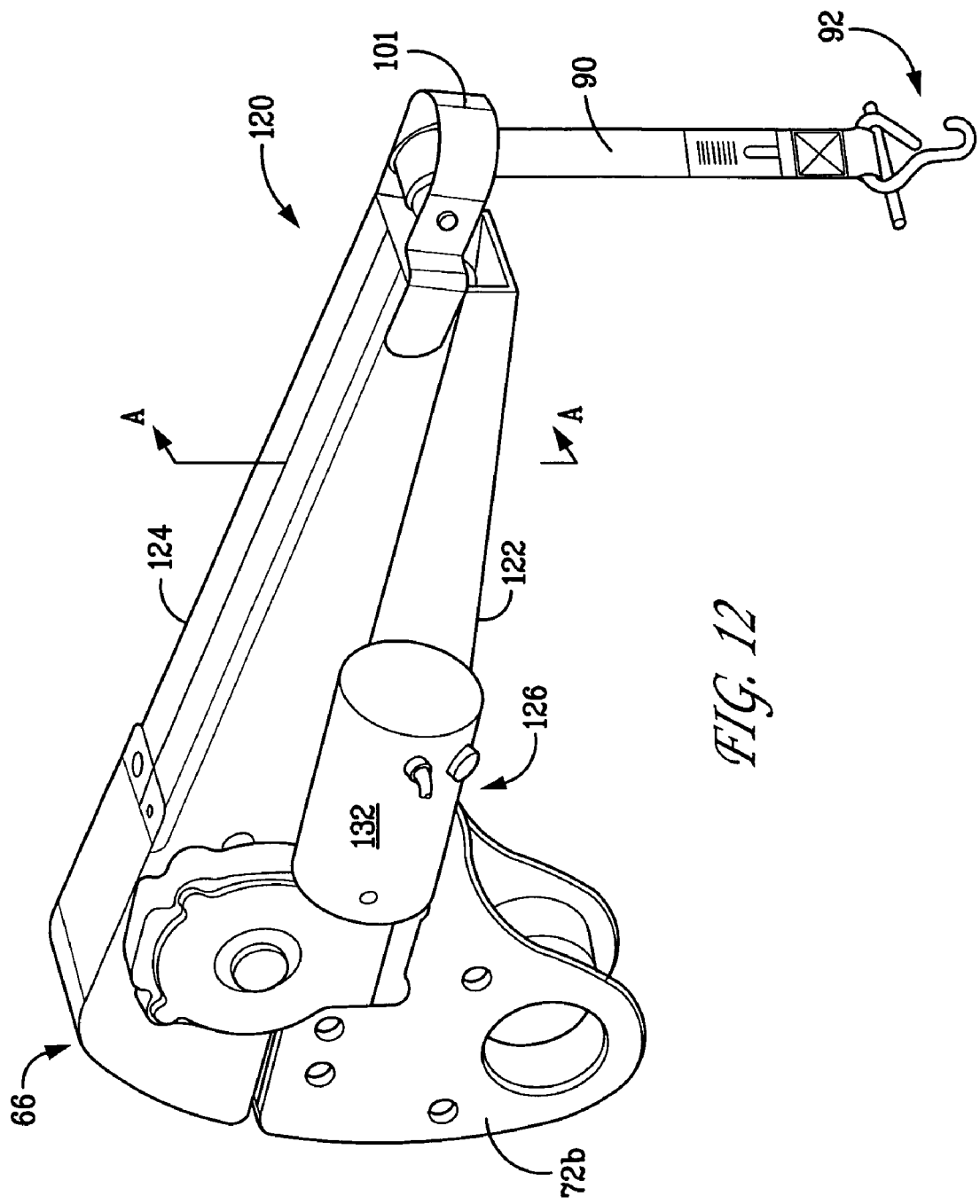
FIG. 12 is a perspective view of an alternative embodiment of the lifting arm assembly of the lifting device shown in FIGS. 1-5, with a second portion of the lifting arm assembly fully retracted in relation to a first portion of the lifting arm assembly.
Figure 13:
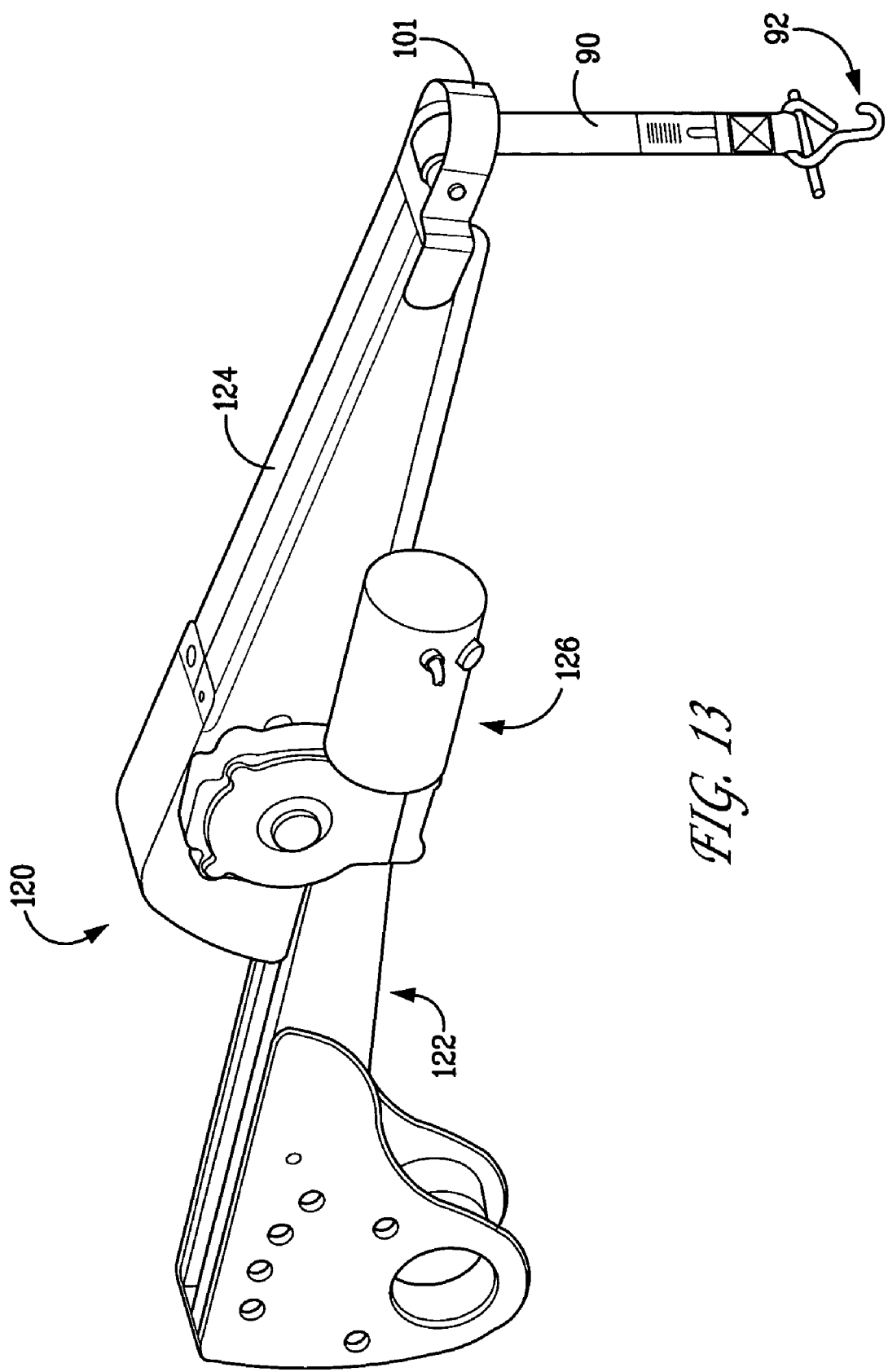
FIG. 13 is a perspective view of the lifting arm assembly shown in FIG. 12, with the second portion of the lifting arm assembly fully extended in relation to the first portion of the lifting arm assembly.
Figure 35:
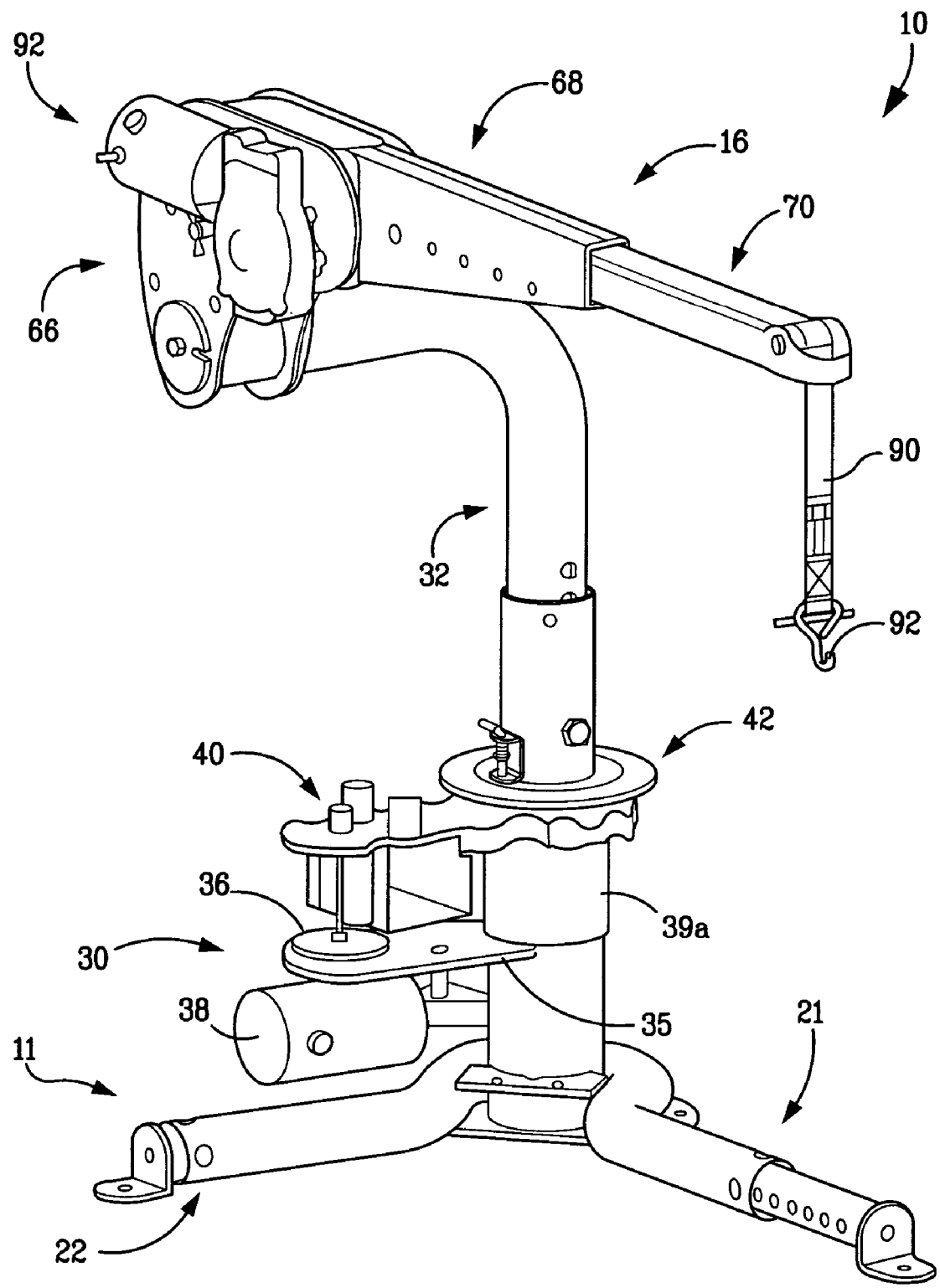
FIG. 35 is a perspective view of the lifting device shown in FIGS. 1-5, 29, and 34, with a cover and a supporting structure of a drive assembly of the device removed.

The drive assembly 30 preferably comprises the first collar 26, an electric motor 38, a motor sprocket 35, a first sprocket 36, and a second sprocket 40 (see FIGS. 7, 8, and 35). The electric motor 38, and sprockets 35, 36, 42 are supported by a supporting structure 39. The supporting structure 39 is fixedly coupled to the first collar 26 by way of a sleeve 39a secured around the first collar 26.

The drive assembly 30 also comprises a third sprocket 42, a first and a second chain (not shown), and a second collar 44. A flange 51 is secured to the second collar 22, as shown in FIG. 7. The second collar 44 extends through the third sprocket 42, but is not fixed to the third sprocket 42. The third sprocket 42 is trapped between the upper edge of the first collar 26, and the bottom of the flange 51. The second and third sprockets 40, 42 are preferably covered by a plastic cover 57.

The motor 38 is mechanically coupled to the second sprocket 40 by way of the motor sprocket 35, the first chain, and the first sprocket 36 so that actuation of the motor 38 causes the second sprocket 40 to rotate. Rotation of the second sprocket 40 imparts rotation to the third sprocket 42 by way of the second chain.

Figure 32:
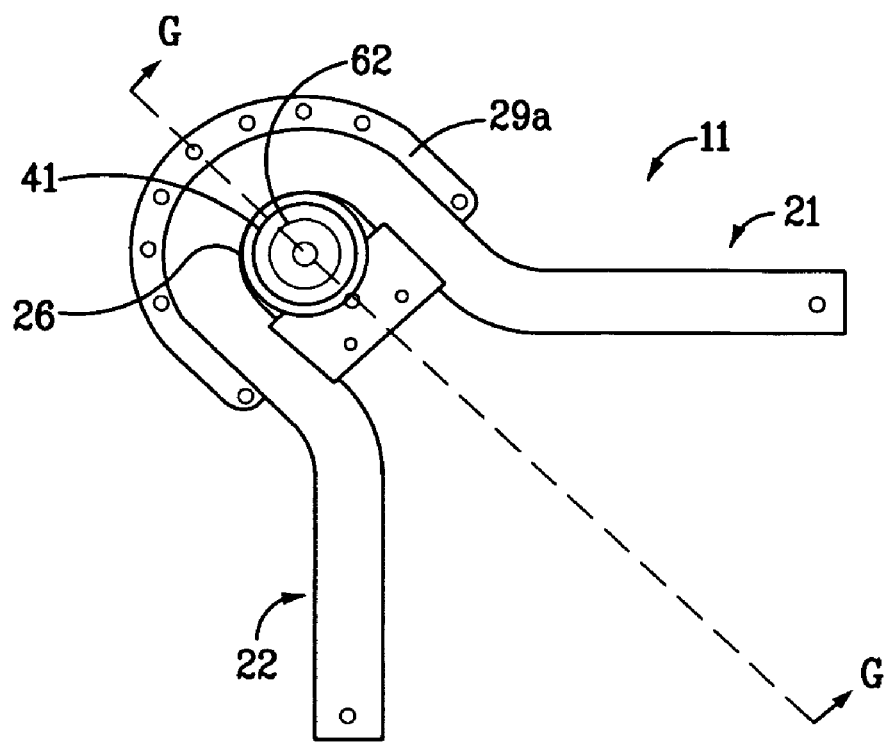
FIG. 32 is a top view of a base assembly and a first collar of the lifting device shown in FIGS. 1-5 and 29.
Figure 33:
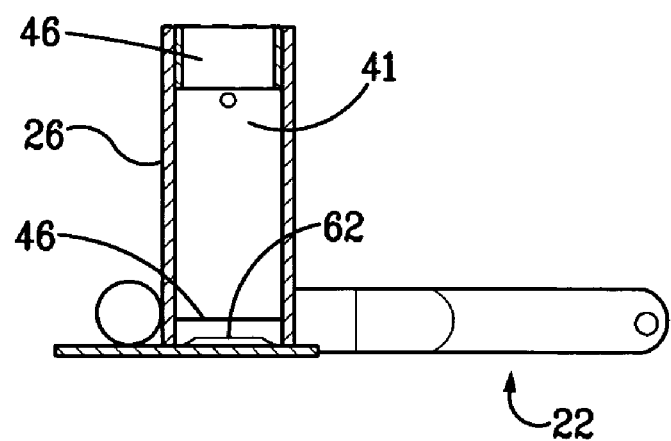
FIG. 33 is a cross-sectional side view of the base assembly and the first collar shown in FIG. 32, taken through the line "G-G" for FIG. 32.

The motor 38 is preferably activated and deactivated by the user through the use of a pushbutton control unit (not shown) electrically coupled to the motor 38 by wiring, an infrared or radio communication link, or other suitable means. Wiring 41 that provides power, control signals, etc. to the electric motor 38 is preferably routed through the first collar 26 (see FIGS. 32 and 33). This feature is believed to lower the potential for the wiring to become damaged or inadvertently disconnected. Moreover, the wiring 41 and the motor 38 are preferably interconnected using conventional quick-disconnect electrical connectors such as spade connectors (not shown).

A lower portion (not shown) of the second collar 44 is positioned within the first collar 26. The second collar 44 rests on a bearing surface 62 within the first collar 26 (see FIG. 33). The second collar 44 is supported by, and is rotatably coupled to, the first collar 26 by way of two bushings 46 (see FIG. 33). The bushings 46 can be formed from plastic, TEFLON, or other suitable material.

Figure 4:
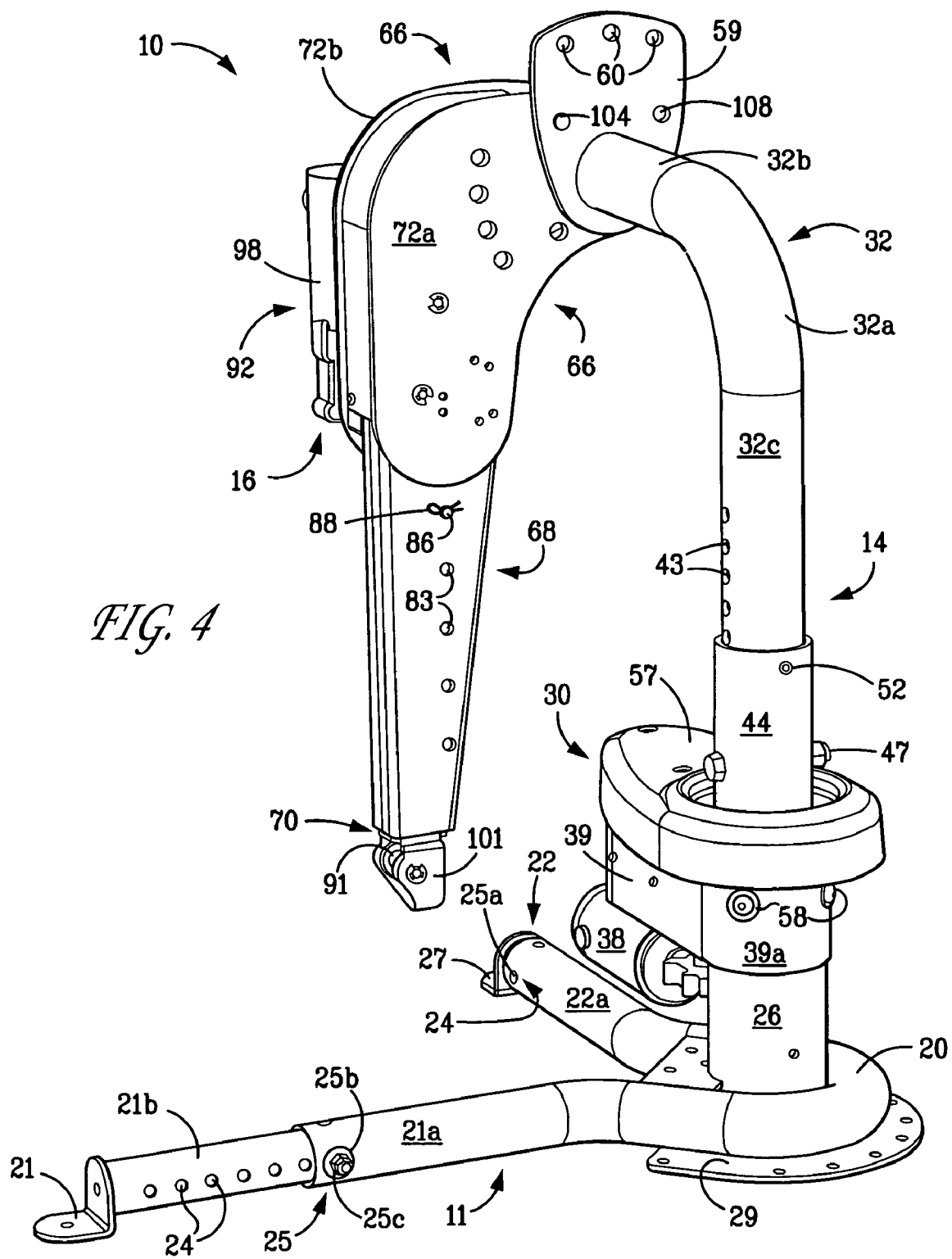
FIG. 4 is a perspective view of the lifting device shown in FIGS. 1-3, with a lifting arm assembly of the lifting device in a stored position.

The sleeve 39a is preferably secured to the first collar 26 using conventional fasteners 58 (see FIG. 4). The drive assembly 30 of the mounting column assembly 14 can be reconfigured between left-hand and right-hand installations by removing the fasteners 58, and rotating the collar 39a (and the rest of the supporting structure 39) around the first collar 26 (see FIGS. 10A and 10B). The first collar 26 includes holes (not shown) that accept that fasteners when the sleeve 39a in positions corresponding to both left-hand and right-hand installations. This feature obviates the need to disassemble or remove the drive assembly 30 when reconfiguring the lifting device 10 between left-hand and right-hand installations.

The second collar 44 receives the column 32, as shown in FIGS. 1-5, 7, and 8. The second collar 44 preferably has two diametrically opposed holes 43 formed therein, and the column 32 preferably has a plurality of holes 45 formed therein. Each of the holes 45 is diametrically opposed to another one of the holes 45. The pairs of opposing holes 45 are spaced apart along a portion of the length of the column 32.

The holes 43, 45 facilitate adjustment of the height of the column 32. In particular, the column 32 can be moved into or out of the second collar 44 so as to align the holes 43 with a corresponding pair of the holes 45 when the height of the height of the column 32 is at or near a desired value. A fastener 47 can be inserted through the aligned holes 43, 45 to secure the column 44 to the sleeve 32. The second collar 44 has set screws installed therein (see FIGS. 7 and 8). The set screws 52 can be tightened to remove the clearance between the second collar 44 and the column 32.

The drive assembly 30 also includes a pin 48 (see FIG. 7). The pin 48 is biased in a downward direction (from the perspective of FIG. 7) by a spring 49. The pin 48 is mechanically coupled to the second collar 44 by a bracket 50. Holes (not shown) are formed in the flange 51 and the third sprocket 42. An end portion of the pin 48 extends into the holes during normal operation of the lifting device 10. The pin 48 thereby engages the third sprocket 42 so that rotation of the third sprocket 42 imparts a corresponding rotation to the second collar 44 (and the column 32).

The pin 48 is movable in a vertical direction (from the perspective of FIG. 7). The pin 48 can be lifted manually, against the bias of the spring 49, so that the end of the pin 48 backs out of the hole formed in the third sprocket 42. This action de-couples the second collar 44 (and the column 32) from the third sprocket 42, and thereby allows the column 32 to be rotated on a manual basis. This feature can be used if the drive assembly 30 becomes inoperative due to, for example, loss of electrical power.

Orienting the pin 48 vertically is believed to save space within the lifting device 10, and to make the pin 48 easier to pull than a horizontally-oriented pin. Moreover, orienting the pin 48 vertically, it is believed, moves the point of restraint between the pin 48 and the third sprocket 42 farther from the centerline of the second collar 44 than would otherwise be possible. This arrangement can thereby reduce the shear stress within the pin 49.

The drive assembly 30 preferably includes a limit switch 53 electrically coupled to the motor 38, a bolt 54, and a nut 56 threadably coupled to the bolt 54 (see FIGS. 7 and 8). The bolt 54 and nut 56 are mounted on a bracket 55 fixedly coupled to the third sprocket 42. The position of the head of the bolt can be adjusted using a weld nut 61 secured to the bracket 55, so that the head contacts the limit switch 53 when the column 32 reaches the end of its desired range of travel. The nut 56 is used to lock the bolt 54 in position. The limit switch 53, in response, generates an electrical signal to the motor 38, thereby causing the motor 38 to deactivate.

The head of the bolt 54 contacts a bracket 39b of the supporting structure 39 if the column 32 overshoots its desired range of travel. The relatively robust bracket 39b thus acts as a mechanical stop in the event the motor 38 does not deactivate, and can thereby prevent damage to other components of the lifting device 10 and the transporting vehicle.

The drive assembly 30 includes a second limit switch (not shown), a second bolt 54, a second nut 56, and a second weld nut 61 for interrupting rotation of the column 32 when the column 32 reaches the opposite end of its desired range of travel. The head of the second bolt 54 contacts the bracket 39b if the column 32 overshoots its desired range of travel.

It should be noted that the column 32 can be positioned manually in alternative embodiments of the lifting device 10. In other words, alternative embodiments of the lifting device 10 can be formed without the motor 38 and is associated drive gear.

Figure 31:
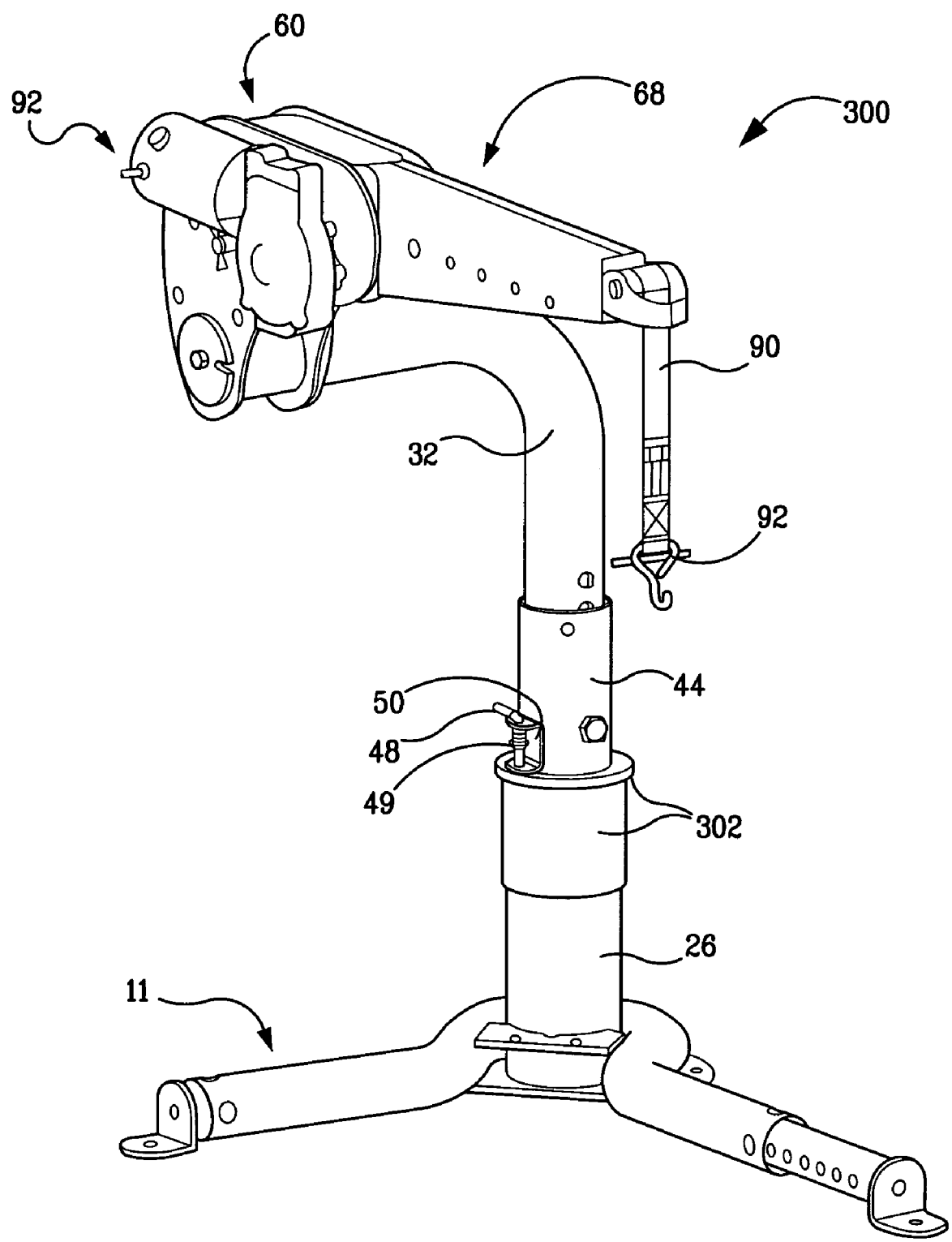
FIG. 31 is a perspective view of an alternative embodiment of the lifting device shown in FIGS. 1-5 and 29.

For example, FIG. 31 depicts a lifting device 300 in which the column 32 is positioned manually. Components of the lifting device 300 that are substantially identical to those of the lifting device 10 are denoted by identical reference characters in the figures. The pin 48, spring 49, and bracket 50 are mounted on the second collar 44 as described above with respect to the lifting device 10.

The lifting device 300 comprises a ring collar 302 fixedly coupled to the first collar 26. The ring collar 302 can have one or more holes (not shown) formed therein for receiving an end of the pin 48. The engagement of the pin 48 and the ring collar 302 locks the column 32 (and the lifting arm assembly 16) in place in relation to the first sleeve 26. The column 32 (and the lifting arm assembly 16) can be rotated by lifting the pin 48 to disengage the pin 48 from the hole, and exerting an appropriate force on the column 32 or the lifting arm assembly 16.s The column 32 of the lifting device 10 preferably has a substantially circular cross section. The column 32 can have a "gooseneck" shape as depicted in FIGS. 1-5. In other words, the column 32 can have a curved portion 32a that causes a first major portion 32b of the column 32 to extend substantially perpendicular to a second major portion 32c of the column 32.

A bracket 59 is fixedly coupled to the first major portion 32b of the column 32. The bracket 59 preferably has three holes 60 formed therein. Each of the holes 60 is preferably spaced apart from a neighboring one of the holes 60 by approximately twenty degrees (with respect to a rotational axis corresponding to the centerline of the first major portion 32b of the column 32). The significance of this feature is discussed below.

The lifting arm assembly 16 is used to lift the personal transportation vehicle, as noted previously. The lifting arm assembly 16 comprises a mounting portion 66, an arm portion 68 fixedly coupled to the mounting portion 66, and a boom portion 70 telescopically mounted in the arm portion 66.

The mounting portion 66 comprises a first and a second side member 72a, 72b each having a relatively large hole 74 formed therein. The holes 74 are substantially aligned, and receive the first major portion 32b of the column 32. The holes 74 are preferably sized so that the first major portion 32b fits snugly (but not tightly) within the holes 76. This arrangement permits the lifting arm assembly 16 to pivot about the first major portion 32b of the column 32.

Figure 5:
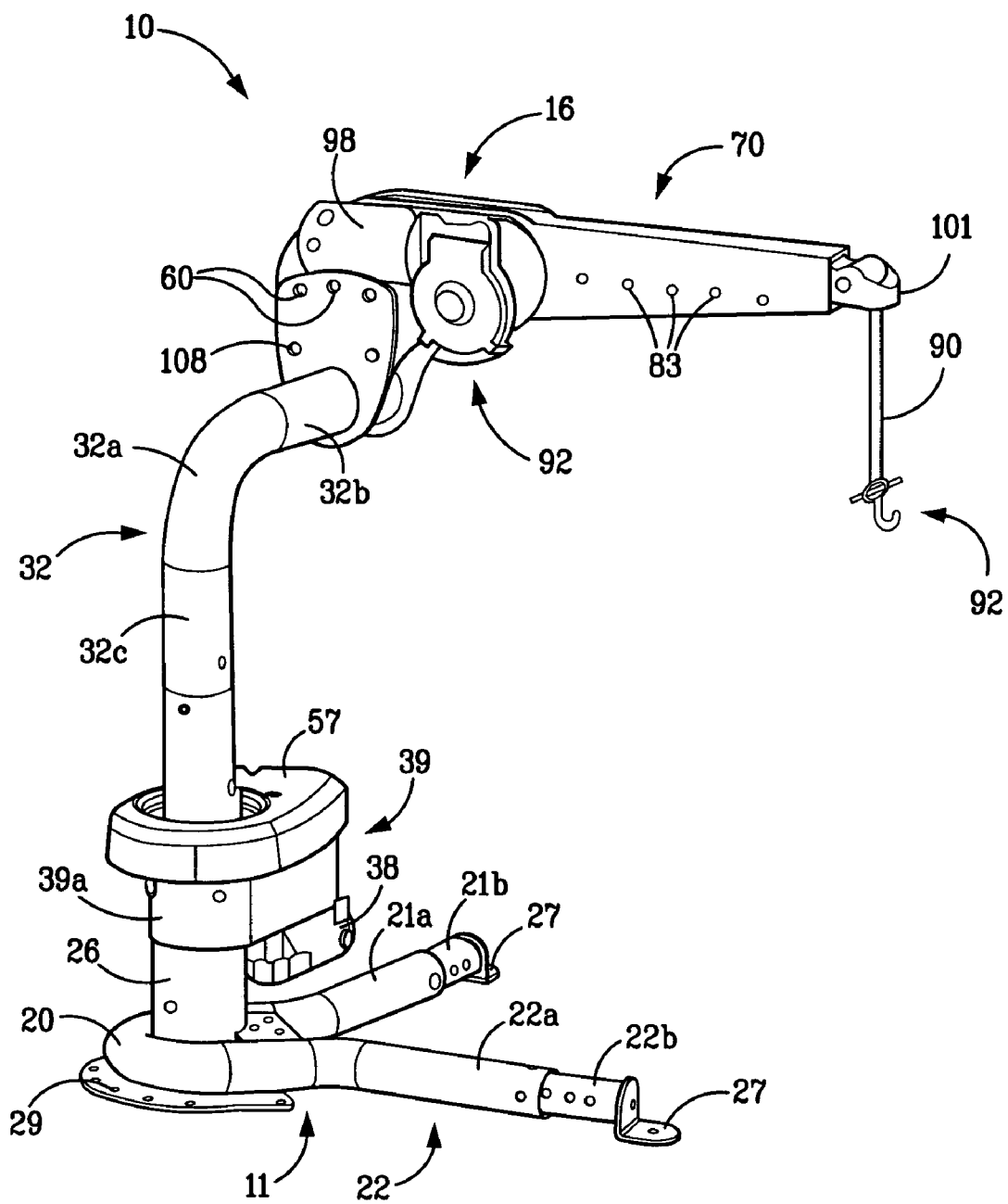
FIG. 5 is a perspective view of the lifting device shown in FIGS. 1-4, configured for a left-hand installation.

The first side member 72a faces the bracket 59. A retaining member 78 is secured to an end the of the first major portion 32b by a fastener 80 (see FIGS. 2 and 3). The second side member 72b faces the retaining member 78. The retaining member 78 and the bracket 59 thus retain the mounting portion 66 (and the lifting arm assembly 16) on the first major portion 32b of the column 32. (It should be noted that the lifting device 10, as depicted in FIGS. 1-4, is configured for a right-hand installation. The noted relationships between the first and second side members 72a, 72, the bracket 59, and the retaining member 78 will be reversed when the lifting device 10 is configured for a left-hand installation, as shown in FIG. 5.)

The lifting arm assembly 16 can be converted back and forth between right-hand and left-hand installations relatively easily by removing retaining member 78, removing the lifting arm assembly 16 from the column 32, reversing the lifting arm assembly 16, i.e., turning the lifting arm assembly 16 one-hundred eighty degrees, and reinstalling the lifting arm assembly 16 and the retaining member 78 on the column 32.

Figure 2:
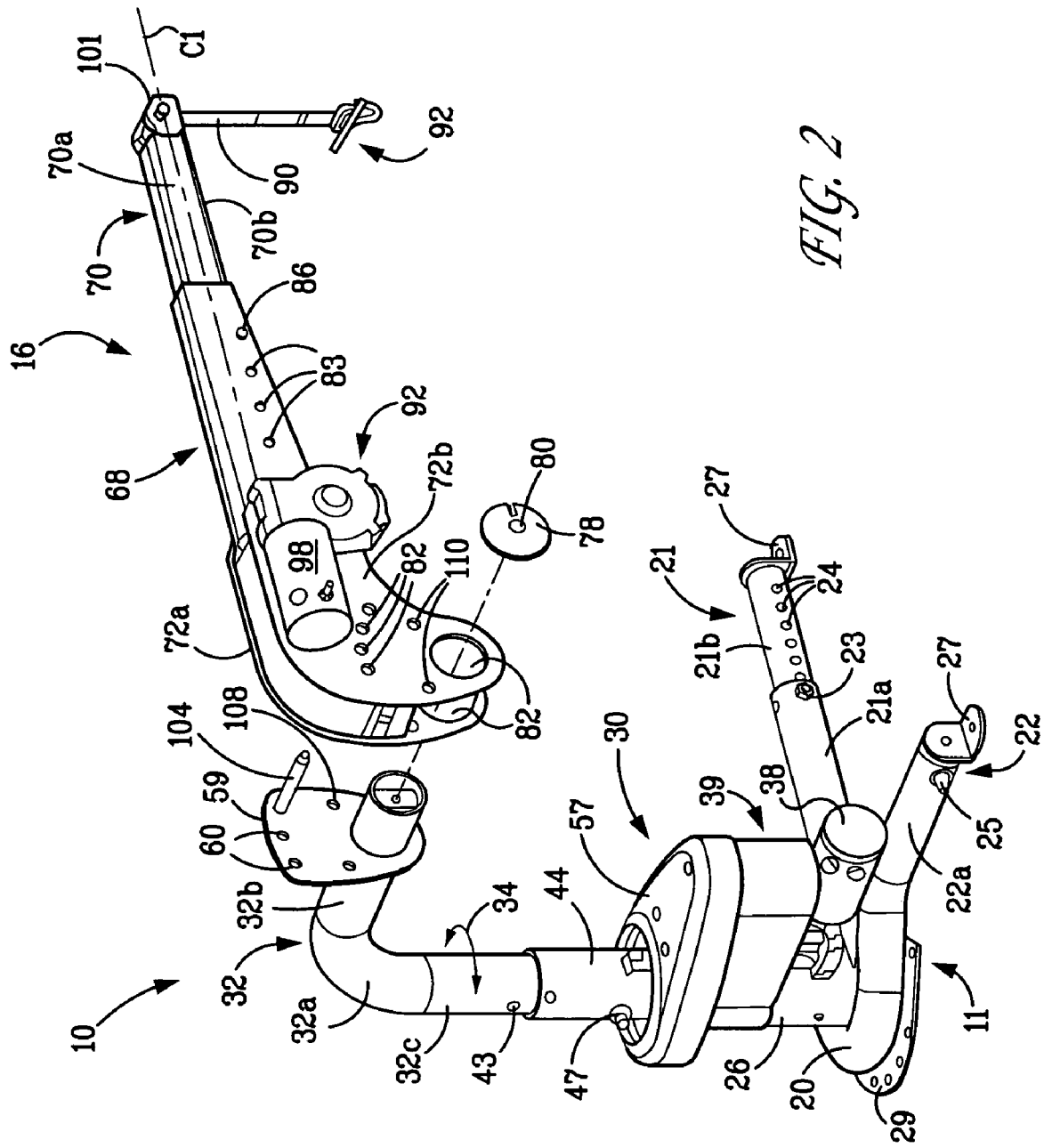
FIG. 2 is a perspective view of the lifting device shown in FIG. 1, in a partially disassembled condition.
Figure 3:
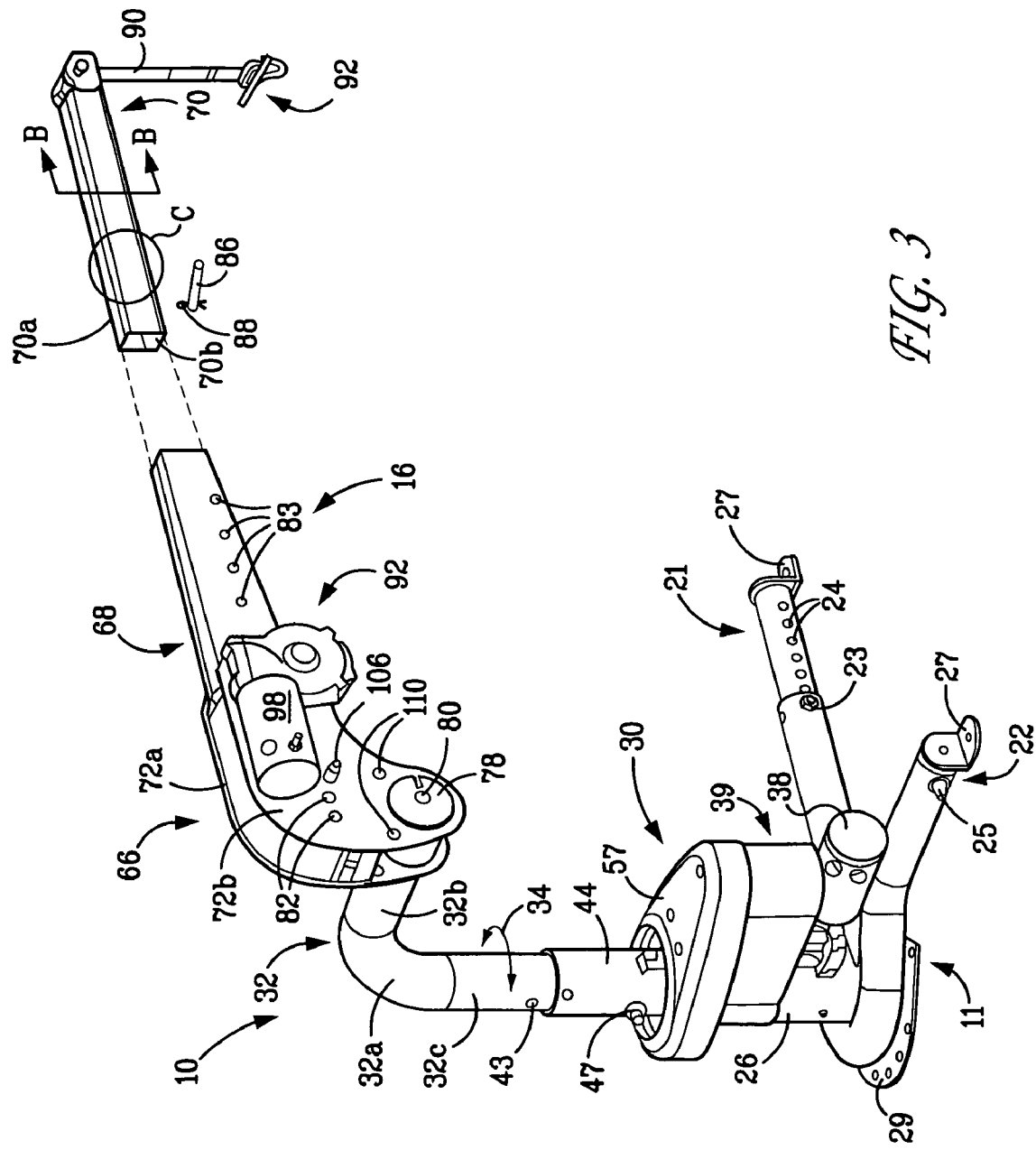
FIG. 3 is another perspective view of the lifting device shown in FIGS. 1 and 2, in a partially disassembled condition.

Preferably, the first and second side members 72a, 72b each have four relatively small holes 82 formed therein (see FIGS. 2-4). Each of the holes 82 is preferably spaced apart from a neighboring one of the holes 82 by an increment of approximately 15 degrees (with respect to a rotational axis corresponding to the centerline of the first major portion 32b of the column 32).

Each of the holes 82 in the first side member 72a is substantially aligned with a corresponding one of the holes 82 in the second side member 72b. Moreover, the holes 82 can be aligned with the holes 60 in the bracket 59 on a selective basis. The significance of these features is discussed below.

The arm portion 68 preferably has a plurality of holes 83 formed in each side thereof. Each of the holes 83 is substantially aligned with a corresponding one of the holes 83 in the other side of the arm portion 68. The aligned pairs of holes 83 are spaced apart along a portion of the length of the arm portion 68. The holes 83 are preferably formed below the longitudinal centerline of the arm portion 68 (the longitudinal centerline of the arm portion 68 is denoted by the referenced character "C1" in FIG. 2).

Figure 21:
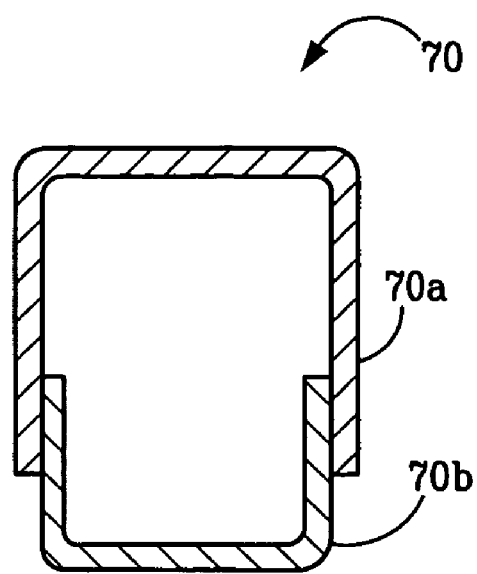
FIG. 21 is a cross-sectional view of a boom portion of the lifting device shown in FIGS. 1-5, taken through the line "B-B" of FIG. 3.
Figure 22:
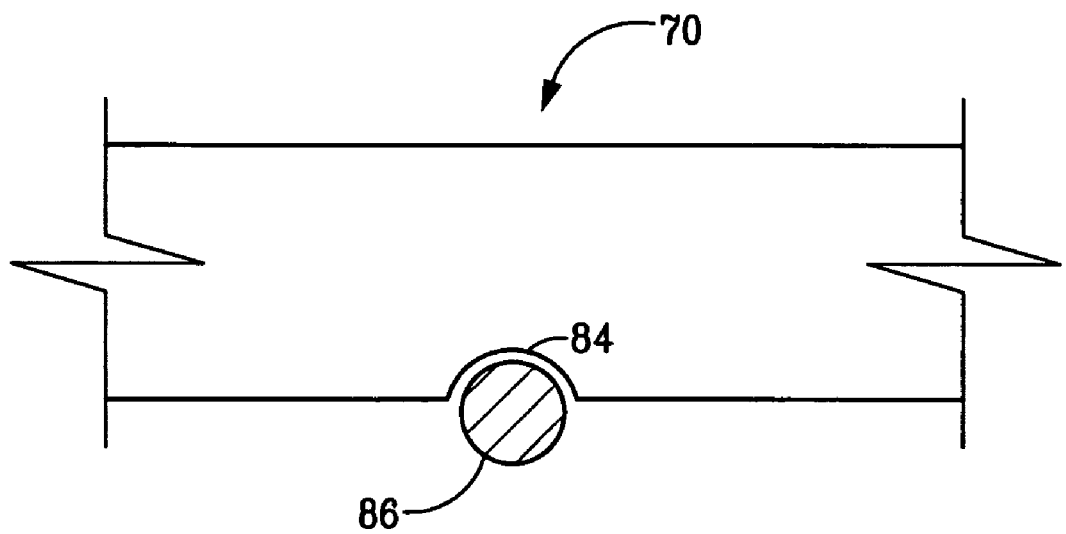
FIG. 22 is a magnified view of the area designated "C" in FIG. 3.

The boom portion 70 preferably comprises a first portion 70*a* having an inverted U-shape, and a second U-shaped portion 70*b* (see FIG. 21). The second portion 70*b* is sized to fit within the first portion, as shown in FIG. 21. The second portion 70*b* is secured to the first portion 70*a* by a suitable conventional means such as welding. This feature is believed to increase the adaptability of the boom portion 70 by permitting the boom portion 70 to be manufactured using non-standard-size tubing that is not commonly available. Each side of the second portion 70*b* preferably has a semi-circular notch 84 formed along a bottom edge thereof (see FIG. 22). The notches 84 are substantially aligned.

The boom portion 70 is telescopically disposed within the arm portion 68, as noted above. The holes 83, 84 facilitate adjustment of the relative positions of the arm portion 68 and the boom portion 70. In other words, the holes 83, 84 permit the overall span of the lifting arm assembly 16 to be adjusted. In particular, the boom portion 70 can be moved into or out of the arm portion 68. The notches 84 can be aligned with a corresponding pair of the holes 83 when the boom portion 70 is at or near a desired position in relation to the arm portion 68. A clevis pin 86 can be inserted through the aligned holes 83, 84 to secure the boom portion 70 in relation to the arm portion 68. The clevis pin 86 can be retained in the holes 83, 84 using, for example, a cotter pin 88 (see FIGS. 1 and 4).

It should be noted that a conventional bolt and nut can be used lieu of the clevis pin 86 and cotter pin 88. The clevis pin 86 and cotter pin 88 are preferred, however, because the clevis pin 86 and cotter pin 88 can be removed and reinstalled relatively quickly, and with minimal effort. Moreover, the clevis pin 86 and cotter pin 88 can be removed and reinstalled without the use of any tooling.

The lifting arm assembly 16 also comprises a lifting strap 90 and an actuator mechanism 92. The actuator mechanism 92, as explained below, retracts and extends the lifting strap 90 into and out of the boom portion 70 to lift or lower the personal transportation vehicle. The lifting strap 90 translates along, and is supported by, a spool 91 rotatably coupled to the boom portion 70 proximate an end thereof.

The lifting strap 90 can be formed from a suitable material, e.g., nylon, having a tensile strength commensurate with the lifting capacity of the lifting device 10. A lifting hook 92 is secured to a first end of the lifting strap 90 (see FIG. 9). The lifting hook 92 engages a suitable lifting point on the personal transportation vehicle.

The actuator mechanism 92 is preferably mounted on the second side member 72*b* of the mounting portion 66, as shown in FIGS. 2, 3, 5, and 11. It is believed that mounting the actuator mechanism 92 in this location, instead of on the boom portion 70, allows the boom portion 70 to be sized smaller than would otherwise be possible.

The actuator mechanism 92 comprises a spool 94, and a first sprocket 96 fixedly coupled to the spool 94 (see FIG. 11). The actuator mechanism 92 also comprises an electric motor 98, and a second sprocket 100 mechanically coupled to the motor 98. Activation of the motor 98 rotates the second sprocket 100. The second sprocket 100 is mechanically coupled to the first sprocket 96 by way of a chain (not shown) so that activation of the motor 98 causes the first sprocket 96 (and the spool 94) to rotate. The motor 98 is preferably activated and deactivated by the user through the use of the above-noted pushbutton control unit.

Wiring 99 that provides power, control signals, etc. to the motor 98 is preferably routed through the first collar 26 and the column 32 (see FIG. 44). This feature is believed to lower the potential for the wiring 99 to become damaged or inadvertently disconnected. Moreover, the wiring and the electric motor 98 are preferably interconnected using the above-noted quick-disconnect electrical connectors.

A second end of the lifting strap 90 is fixedly coupled to the spool 94. Rotation of the spool 94 in a first direction causes the lifting strap 90 to wind onto the spool 94, thereby raising the lifting hook 92 (and the personal transportation vehicle.) Rotation of the spool 94 in a second direction causes the lifting strap 90 to unwind from the spool 94, thereby lowering the lifting hook 92 (and the personal transportation vehicle).

The boom portion 70 comprises a hood 101 mechanically coupled to an end thereof. The hook 92 includes a strap stop 92*a* (see FIG. 9). The strap stop 92*a* contacts the hood 101 when the hook 92 reaches the boom 70 during retraction of the lifting strap 90. Interference between the strap stop 92*a* and the hood 101 prevents the hook 92 from being inadvertently drawn into the boom portion 70.

Figure 30:
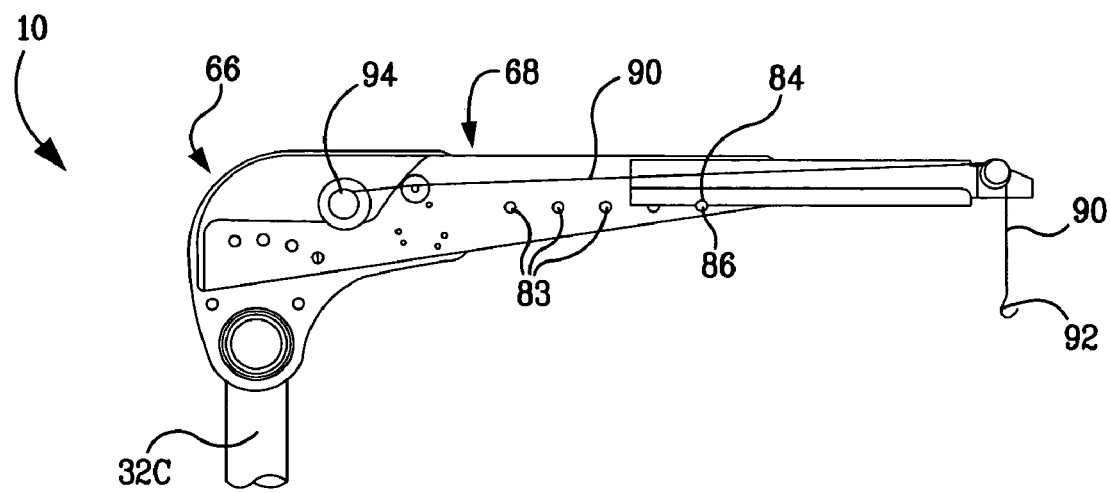
FIG. 30 is a cross-sectional side view of the lifting device shown in FIGS. 1-5 and 29, taken through the line "F-F" of FIG. 29.

The position of the clevis pin 86 within the arm portion 68 and the boom portion 70 is believed to protect the lifting strap 90 from premature wear. In particular, the holes 83 are formed in the arm portion 68 below the centerline C1 thereof, and the notches 84 are formed along a bottom edge of the second portion 70*b* of the boom portion 70, as previously described. These features cause the lifting strap 90 to be positioned above the clevis pin 86 (see FIG. 30). Positioning the lifting strap 90 and the clevis pin 86 in this manner is believed to minimize the potential for the lifting strap 90 to contact the clevis pin 86 (and thereby wear) as the lifting strap 90 is wound onto and off of the spool 94. Moreover, the noted arrangement is believed to minimize the possibility for the lifting strap 90 to be inadvertently positioned below the clevis pin 86 (which can also lead to premature wear) as the clevis pin 86 is inserted into the arm portion 68 and the boom portion 70.

The lifting arm assembly 16 pivots about the first major portion 32*b* of the column 32, as noted above. The lifting arm assembly 16 is secured in a particular orientation in relation to the first major portion 32*b* using the holes 60, 82 formed in the respective bracket 59 and side members 72*a*, 72*b*. In particular, the lifting arm assembly 16 can be pivoted about the first major portion 32*b* on a manual basis so as to align one of the holes 60 with a corresponding pair of the holes 82 when the orientation of the lifting arm assembly 16 is at or near a desired value. A clevis pin 104 can be inserted through the aligned holes 60, 82 to secure the lifting arm assembly 16 in the desired orientation. The clevis pin 104 can be secured in the holes 60, 82 using, for example, a cotter pin 106 (see FIGS. 2 and 3).

The holes 60 are spaced apart by approximately twenty degrees, and the holes 82 are spaced apart by approximately fifteen degrees, as noted previously. This arrangement permits the orientation of the lifting arm assembly 16 to be adjusted in increments of approximately five degrees, while the spacing between the holes 60, 82 can be maintained at approximately twenty degrees and fifteen degrees, respectively. (Potential weakening of the bracket 59 or the side members 72a, 72b associated with spacing the holes 60, 82 by less than fifteen degrees can thus be avoided through the use of this arrangement.)

It should be noted that specific values for the spacing between the holes 60, 82 are provided for exemplary purposes only, and the optimum values for these parameters are application dependent.

The clevis pin 104 can be removed when the lifting device 10 is not in use, and the lifting device 10 can be pivoted downward into a stored position (see FIG. 4). The bracket 59 has two holes formed 108 therein, and the first and second side members 72a, 72b of the mounting portion 66 each have two holes 110 formed therein (see FIGS. 1-5). One of the holes 108 aligns with a corresponding one of the holes 110 when the lifting arm assembly 16 is in the stored position. The clevis pin 104 can be inserted through the aligned holes 108, 110 and secured with the cotter pin 106 to secure the lifting arm assembly 16 in its stored position.

Some or all of the parts of the lifting device 10 that are exposed to the ambient environment can be coated or otherwise treated with a conventional corrosion-protection measure, particularly where the lifting device 10 is to be used in coastal areas.

It is to be understood that even though numerous characteristics and advantages of the present invention have been set forth in the foregoing description, the disclosure is illustrative only and changes can be made in detail within the principles of the invention to the full extent indicated by the broad general meaning of the terms in which the appended claims are expressed.

For example, FIGS. 12-17, 19, and 20 depict a lifting arm assembly 120 that can be used in lieu of the lifting arm assembly 16. The lifting arm assembly 120 comprises a first portion 122 and a second portion 124 slidably coupled to the first portion 122. The lifting arm assembly 120 also comprises an actuator mechanism 126 that causes the second portion 124 to extend and retract in relation to the first portion 122. (Components of the lifting arm assembly 120 that are substantially identical to those of the lifting arm assembly 16 are denoted by identical reference characters in the figures.)

The first portion 122 includes mating features 128, and the second portion 124 includes complementary mating features 130 for coupling the first and second portions 122, 124.

Figure 14:
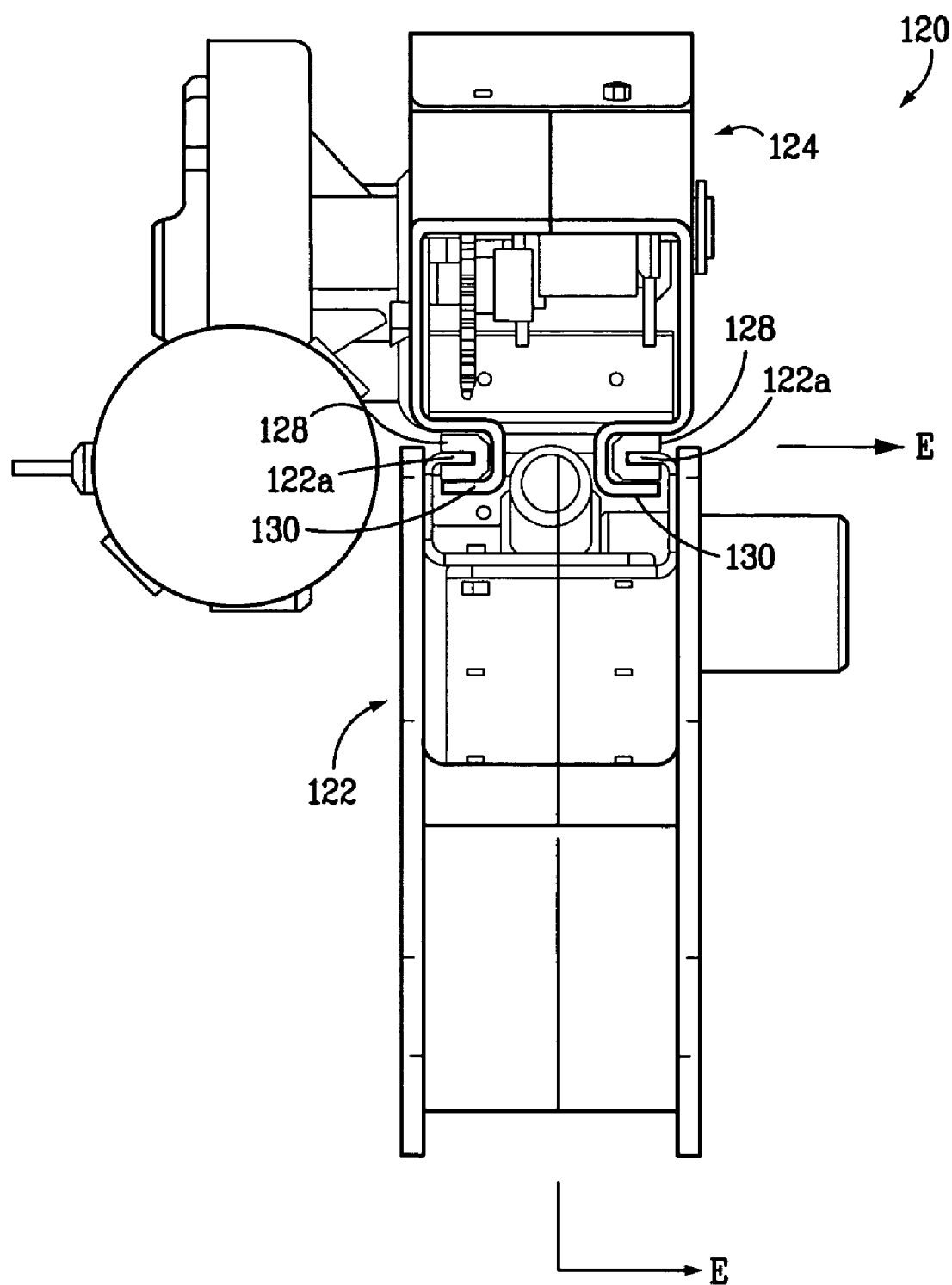
FIG. 14 is a cross-sectional view of the lifting arm assembly shown in FIGS. 12 and 13, taken through the line "A-A" of FIG. 12.

The mating features 128, 130 can be configured as depicted, for example, in FIG. 14. In particular, the mating features 130 can each have a substantially C-shaped cross section, and can extend along the bottom of the second portion 124. The mating features 128 can each have a substantially C-shaped cross section, and can securely engage a respective lip 122a formed on the first portion 122. The mating features 130 are positioned within, and slidably engage the mating features 128, as shown in FIG. 14. The mating features 130 can be formed from plastic, TEFLON, or other suitable material.

Figure 15:
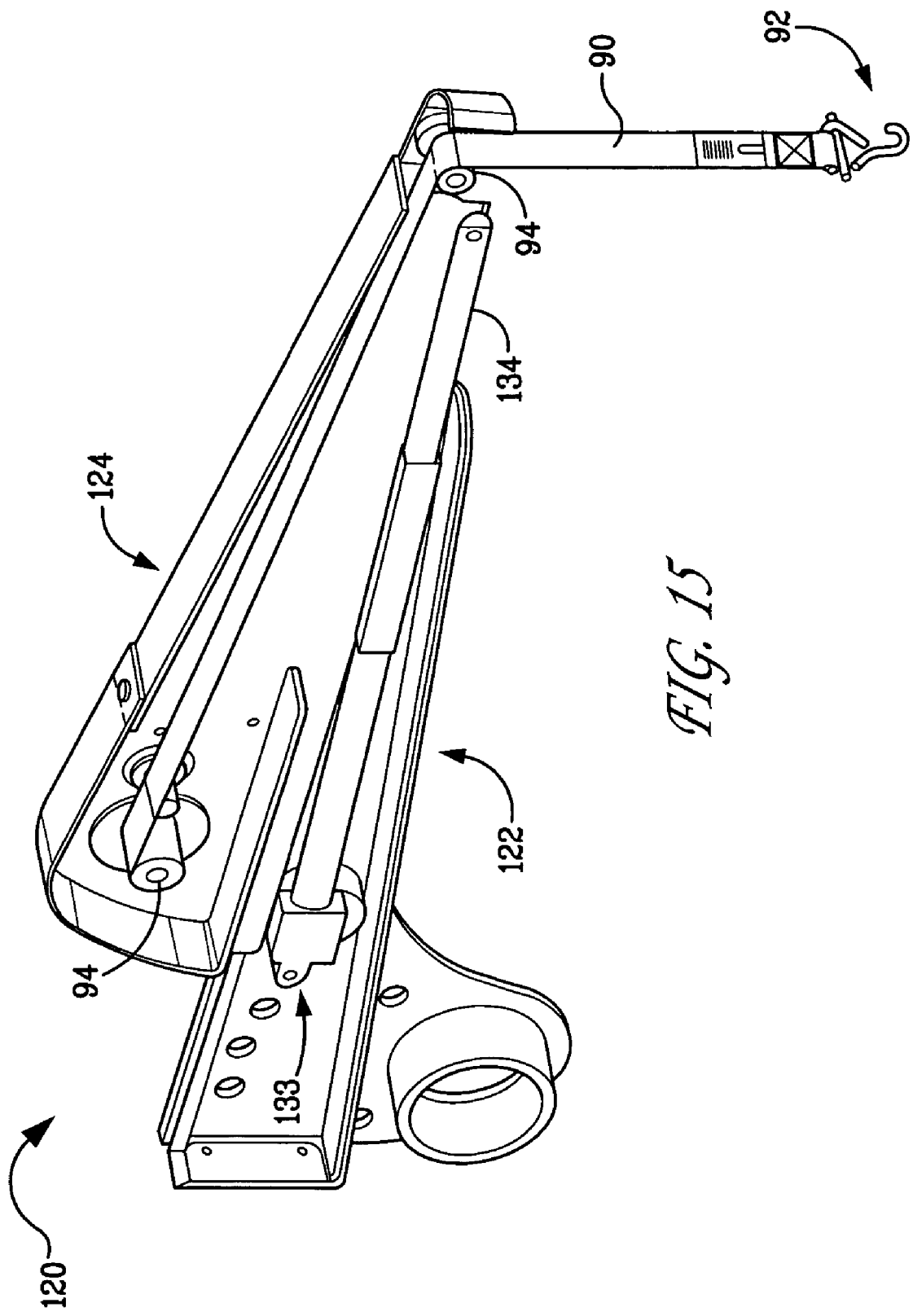
FIG. 15 is a cross-sectional view of the lifting arm assembly shown in FIGS. 12-14, taken through the line "E-E of FIG. 14.

The actuator mechanism 126 comprises a motor 132 and a drive train 133 mechanically coupled to the motor 132. The motor 132 is mounted on, and toward the rear of, the second portion 124 (see FIGS. 12, 13, and 16). The motor 132, when activated, causes a rod 134 of the drive train 133 to translate linearly in a first or an opposing second direction. An end of the rod 134 is fixedly coupled to the second portion 124, as shown in FIG. 15. The motor 132 is preferably activated and deactivated by the user through the use of the above-noted pushbutton control unit.

Movement of the rod 134 causes the second portion 124 to extend from, or retract towards, the first portion 122. This arrangement is believed to maximize the range of travel of the second portion 124 in relation to the first portion 122, thereby maximizing the extent to which the second portion 124 can be extended from the first portion 122.

Mounting the motor 132 on, and toward the rear of, the second portion 124 places the motor 132 out of the way of the personal transportation vehicle being lifted. Moreover, since the motor 132 travels with the second portion 124, the motor 132 remains out of the way as the second psortion 124 is extended and retracted.

Figure 16:
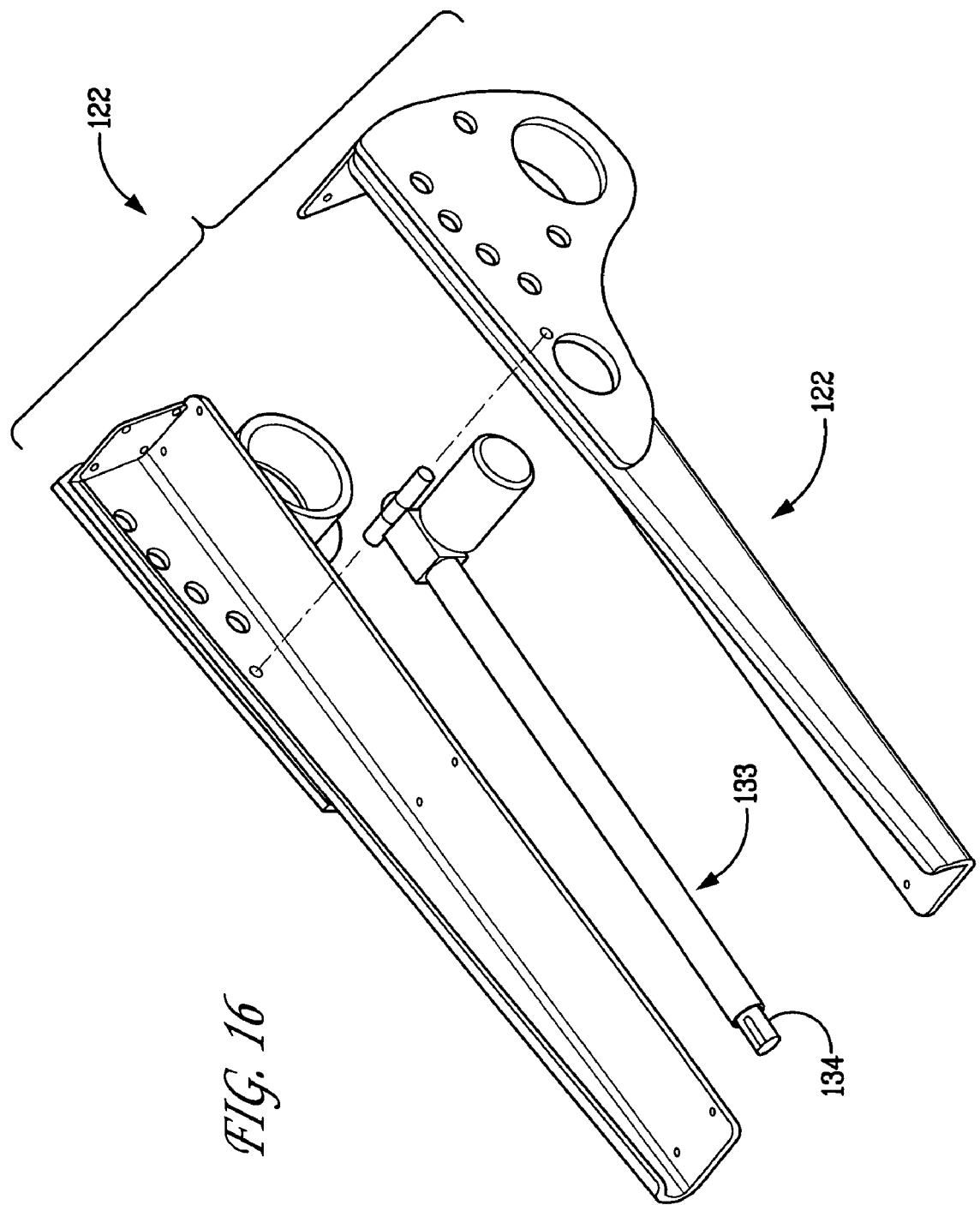
FIG. 16 is an exploded perspective view of first portion of the lifting arm assembly in FIGS. 12-15.
Figure 17:
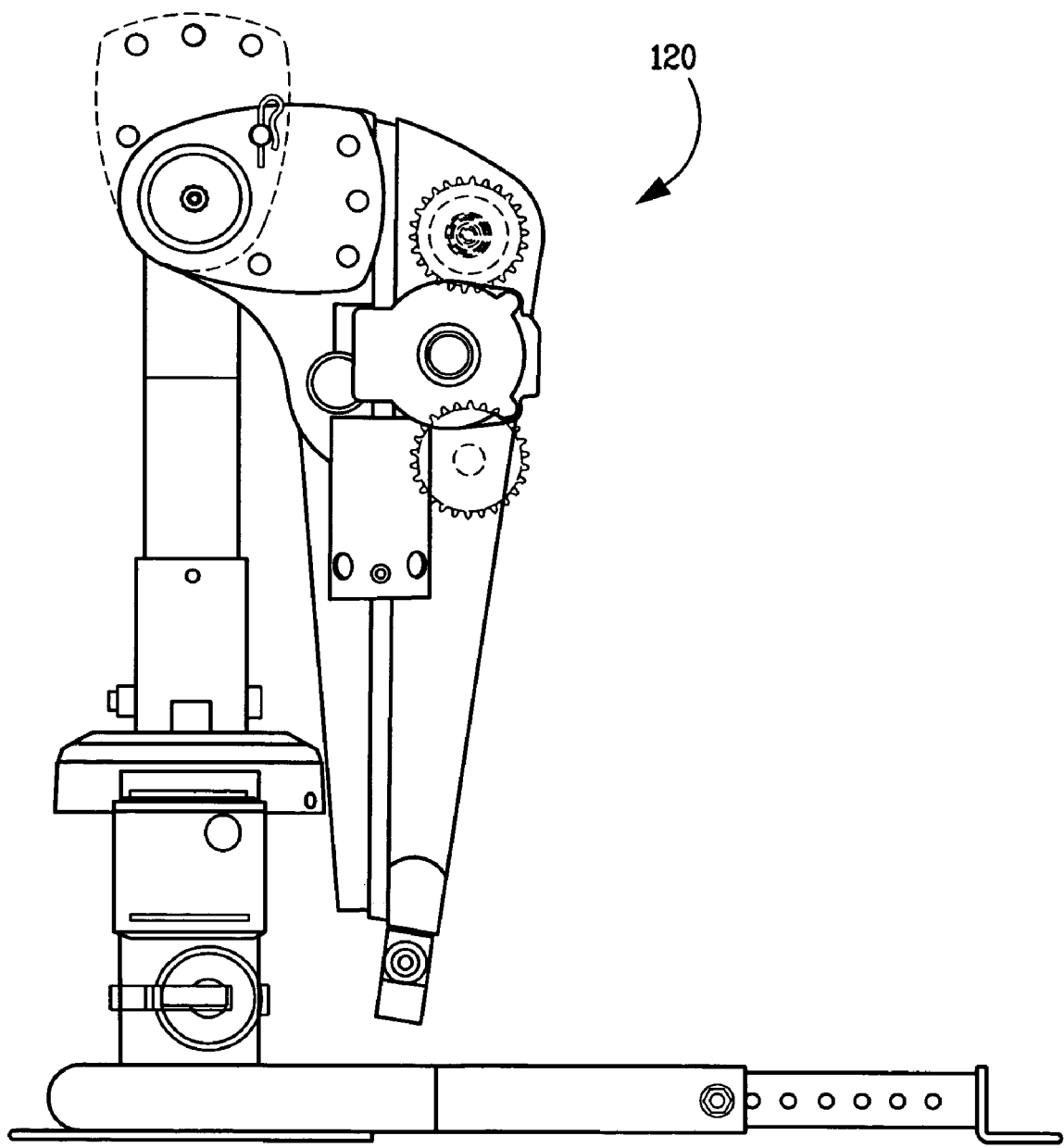
FIG. 17 is a side view of the lifting arm assembly shown in FIGS. 12-16, in a stored position.

The first portion 122 is preferably constructed in two halves configured to capture the second portion 124 when the halves are assembled (see FIGS. 14 and 16).

Wiring (not shown) that provides power, control signals, etc. to the motor 132 is preferably routed through the first collar 26 and the column 32. This feature is believed to lower the potential for the wiring to become damaged or inadvertently disconnected. Moreover, the wiring and the electric motor 132 are preferably interconnected using the above-noted quick-disconnect electrical connectors.

Figure 20:
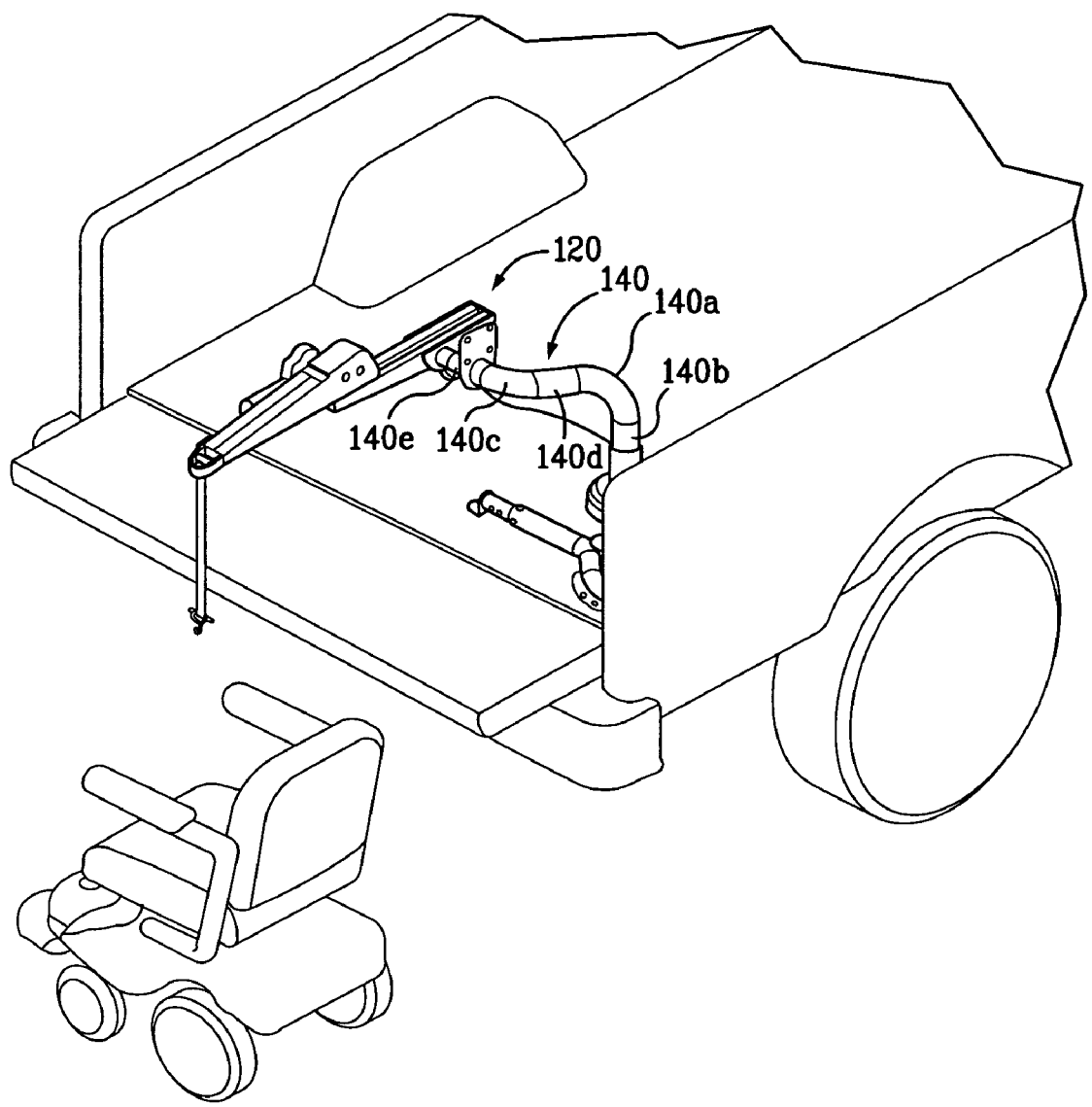
FIG. 20 is a perspective view of the mounting arm and the base assembly shown in FIGS. 18 and 19.

FIGS. 19 and 20 depict an alternative embodiment of the column 32. In particular, FIGS. 19 and 20 depict a column 140 having a curved portion 140a, and a major portion 140b. The curved portion 140a and the major portion 140b are substantially identical to the curved portion 32a and the second major portion 32c, respectively, of the column 32.

The column 140 also comprises a curved portion 140c, a substantially straight portion 140d that adjoins the curved portions 140a, 140c, and a substantially straight portion 140e that adjoins the curved portion 140c. The curved portion 140c is preferably configured so that the portion 140d extends in a first direction, and the portion 140e extends in a second direction oriented at an angle of, for example, approximately one-hundred twenty-five degrees in relation to the first direction. This particular arrangement can increase the extension of the boom member 70 in relation to the base assembly 11 by approximately 9.5 inches, and can thus provide the additional clearance that is often required when lifting device 10 is installed in a pickup truck or other vehicle having a tailgate.

Another preferred embodiment of a lifting device 200 is depicted in FIGS. 23-26. The lifting device 200 comprises a base assembly 202, a mounting column assembly 204, and a lifting arm assembly 206. The lifting arm assembly 206 is used to lift the personal transportation vehicle onto or off of the transporting vehicle. The mounting column assembly 204 is used to support the lifting arm assembly 206, and the base assembly 202 is used to mount the lifting device 200 on the transporting vehicle.

The base assembly 202 comprises a first leg 208, and a second leg 210 that adjoins the first leg 208. Preferably, the first leg 208 and the second leg 210 are substantially perpendicular.

The first leg 208 preferably comprises a first portion 208a, and a second portion 208b telescopically disposed within the first portion 208a. The first portion 208a preferably has two diametrically opposed holes 212 formed therein, and the second portion 208b preferably has a plurality of holes 214 formed therein. Each of the holes 214 diametrically opposes one of the other holes 214. The opposing pairs of holes 214 are spaced apart along a portion of the length of the second portion 208b.

The holes 212, 214 facilitate adjustment of the overall length of the first leg 208, in the manner described above in relation to first leg 21 of the base assembly 11. The first and second portions 208a, 208b can be secured using a conventional fastener 216.

The second leg 210 preferably comprises a first portion 210a, and a second portion 210b telescopically disposed within the first portion 22a. The first portion 210a preferably has two of the diametrically opposed holes 212 formed therein The second portion 210b preferably has a plurality of the diametrically-opposed holes 214 formed therein that permit the overall length of the second leg 210 to be adjusted using another one of the fasteners 216, in a manner similar to that described above with respect to the first leg 21.

Figure 23:
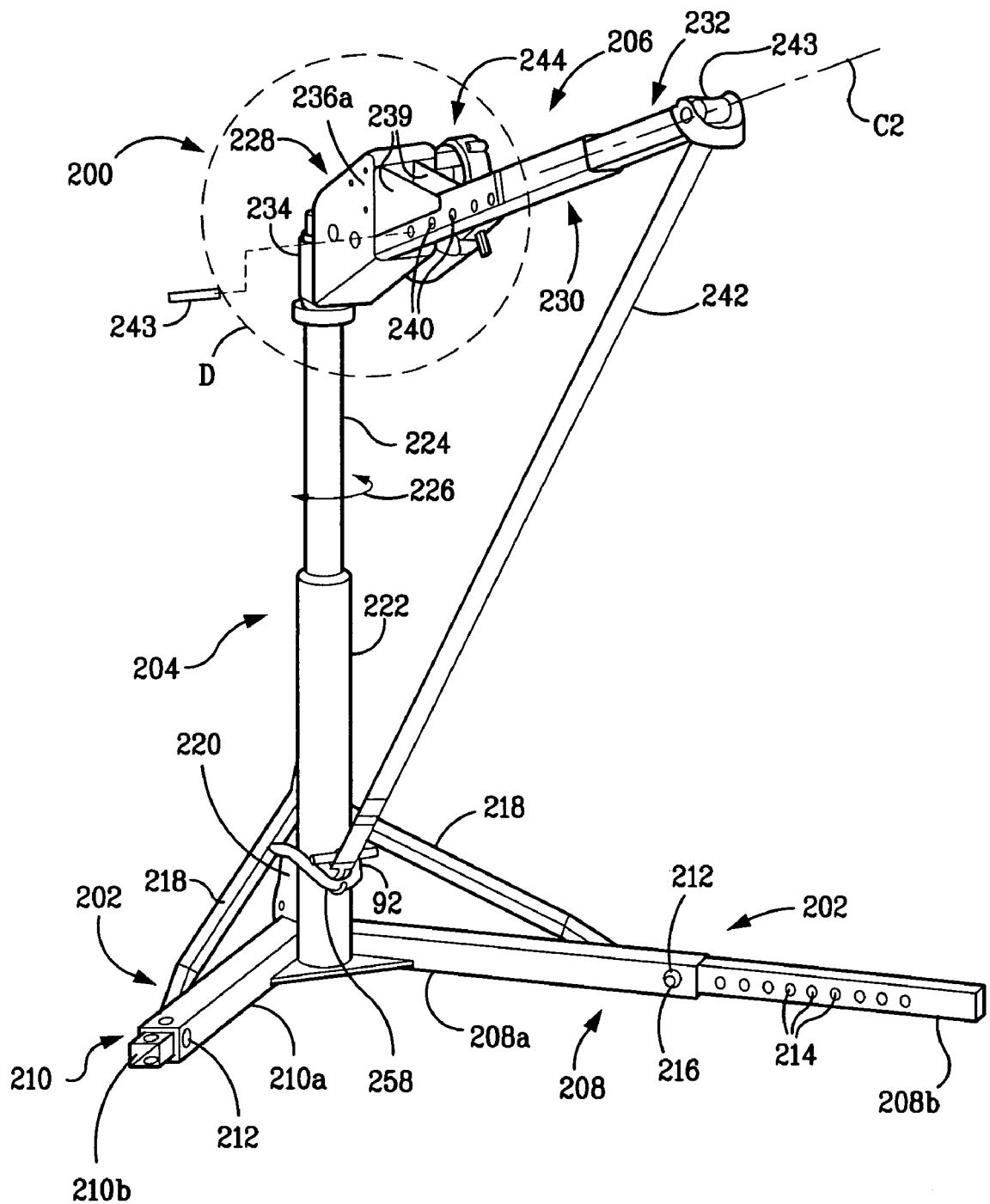
FIG. 23 is a perspective view of another preferred embodiment of a lifting device for a personal transportation vehicle.

The base assembly 202 also comprises a first and a second brace 218 (see FIG. 23). The first and second braces 218 are fixedly coupled to the respective first and second legs 208, 210, and to a plate 220. The plate 220 is fixedly coupled to the first and second legs 208, 210, and to a first column 222 of the mounting portion 204.

The mounting column assembly 204 supports the lifting arm assembly 206, as noted above. The mounting column assembly 204 comprises the first column 222, and a second column 224. A lower portion of the second column 224 is positioned within the first column 222, and is rotatably coupled to the first column 222 by way of bushings (not shown). The bushings can be formed from plastic, TEFLON, or other suitable material. The directions of rotation of the second column 224 are denoted by the arrow 226 in FIG. 23. This arrangement permits the lifting arm assembly 204 to rotate about the centerline of the second column 224. Hence, the lifting arm assembly 204 can swing outwardly, i.e., toward the outside of the transporting vehicle, so that the personal transportation vehicle suspended from the lifting arm assembly 204 can be lowered to the ground.

Figure 24:
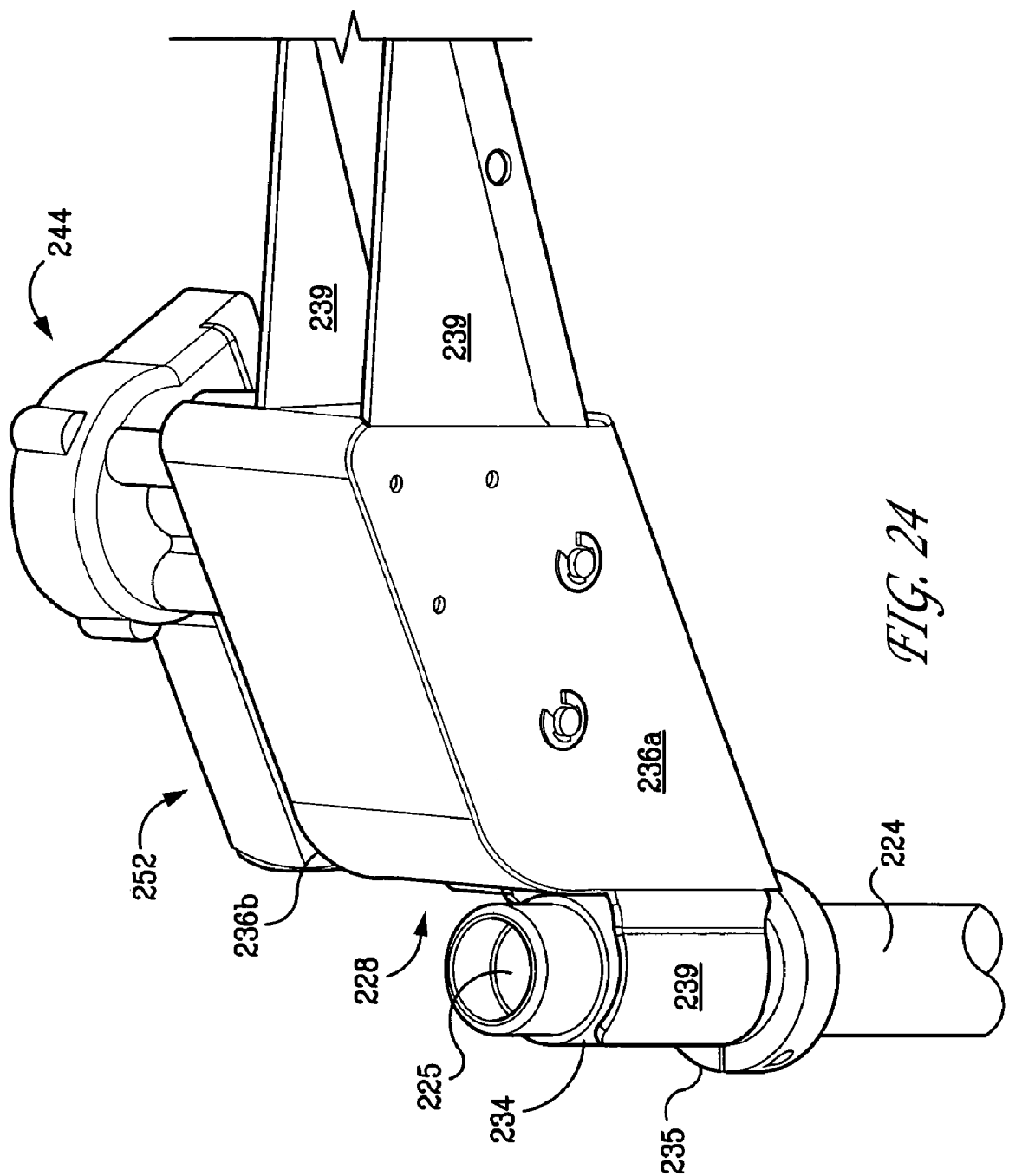
FIG. 24 is a magnified view of the area designated "D" in FIG. 23.
Figure 36:
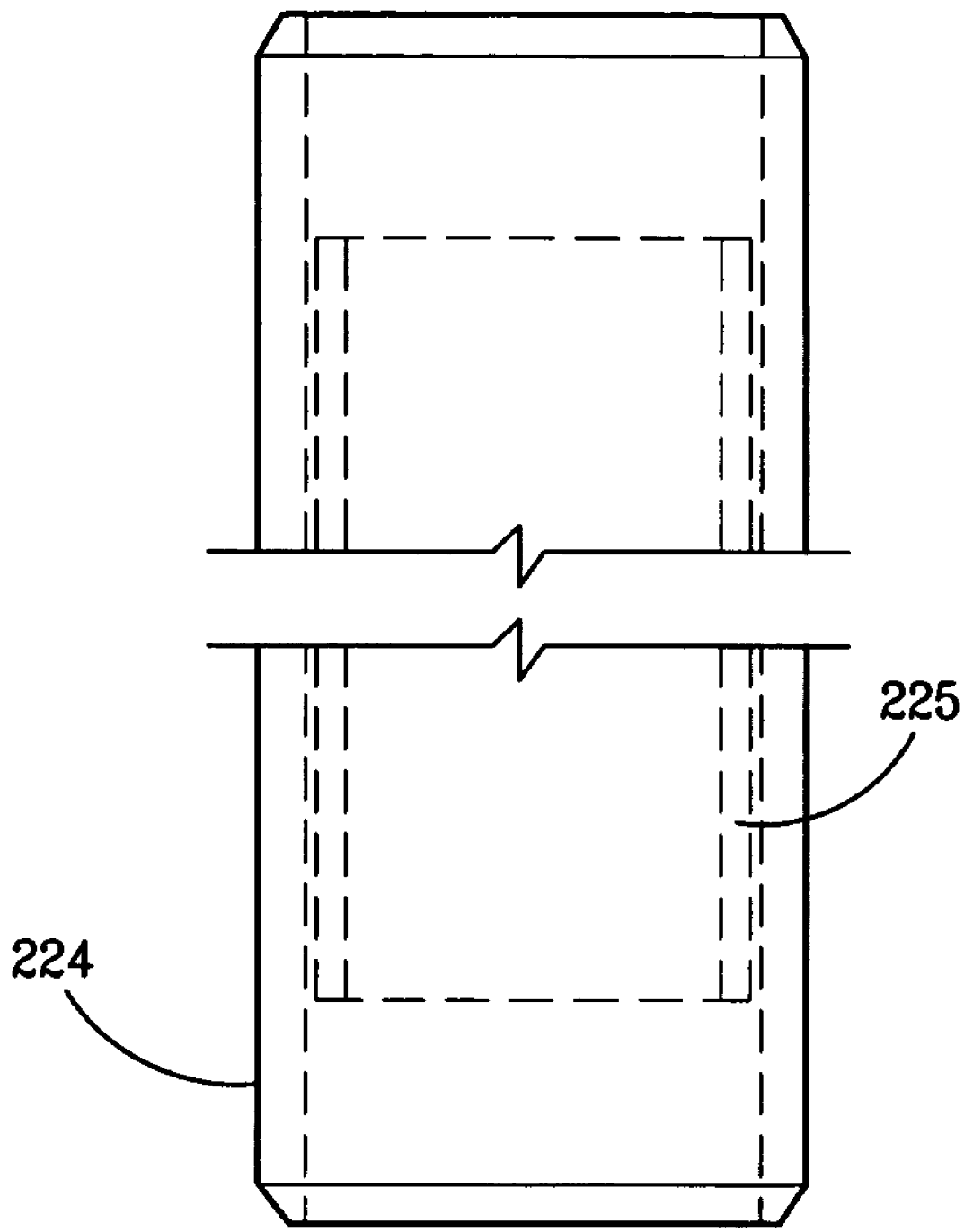
FIG. 36 is a side view of a column of the lifting device shown in FIGS. 23 and 25.

An inner sleeve 225 can be secured within the second column 224 to strengthen the second column 224, if necessary (see FIGS. 24 and 36).

The lifting arm assembly 206 is used to lift the personal transportation vehicle, as noted previously. The lifting arm assembly 206 comprises a mounting portion 228, an arm portion 230 fixedly coupled to the mounting portion 228, and a boom portion 232 telescopically mounted in the arm portion 230.

Figure 27A:
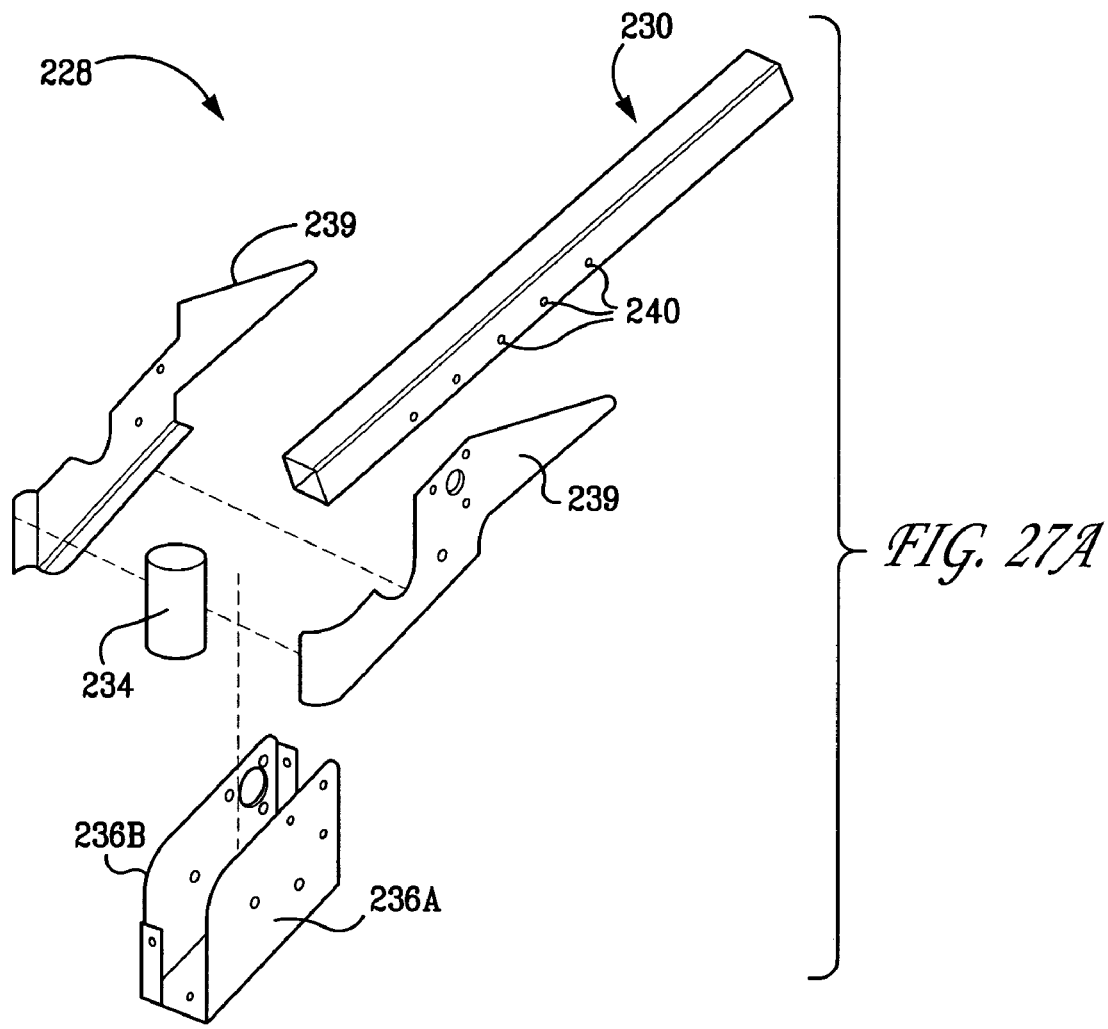
FIG. 27A is an exploded view of a mounting portion and an arm portion of the lifting device shown in FIGS. 23 and 25.
Figure 27B:
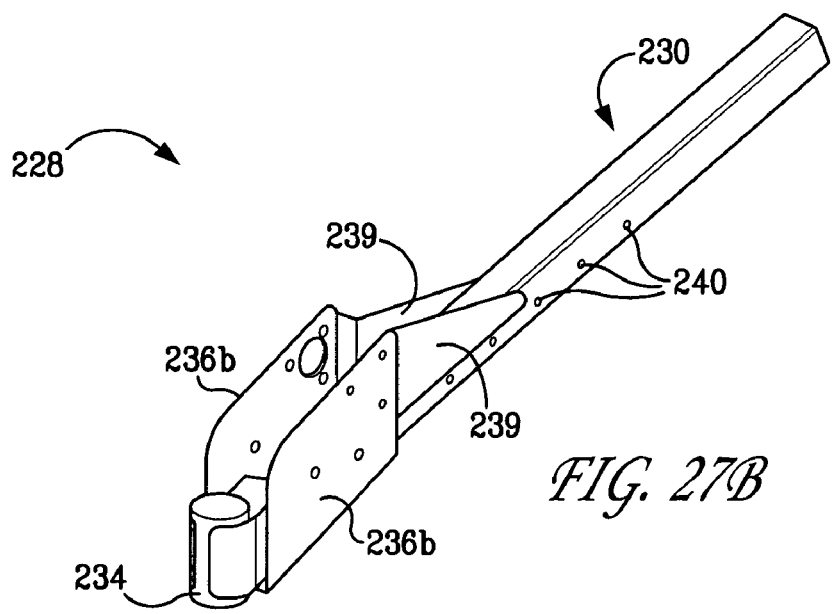
FIG. 27B is perspective view of the mounting portion and the arm portion shown in FIG. 27A.

The mounting portion 228 comprises a collar 234 positioned around the second column 224 and secured to the brackets 239, as shown in FIGS. 24, 27A, and 27B. The mounting column assembly 204 includes a split collar 235 disposed around the second column 224. The split collar 235 supports the collar 234. In other words, the split collar 235 prevents the collar 234 (and the lifting arm assembly 206) from sliding down the second column 224.

The position of the split collar 235 can be adjusted. More particularly, the split collar 235 can be loosened, moved upward or downward on the second column 224, and retightened, thereby allowing the height of the collar 234 (and the lifting arm assembly 206) to be adjusted.

The arm portion 230 is fixedly coupled to the mounting portion 228 by a first and a second bracket 239 (see FIGS. 27A, 27B). The first and second brackets 239, in turn, are fixedly coupled the respective first and second mounting plates 236a, 236b.

The arm portion 232 preferably has a plurality of holes 240 formed in each side thereof. Each of the holes 240 is substantially aligned with a corresponding one of the holes 240 in the other side of the arm portion 232. The aligned pairs of holes 240 are spaced apart along a portion of the length of the arm portion 232. The holes 240 are preferably formed below the longitudinal centerline of the arm portion 232 (the longitudinal centerline of the arm portion 232 is denoted by the referenced character "C2" in FIG. 23).

The boom portion 232 is telescopically disposed within the arm portion 230, as noted above. The boom portion 232 has a pair of opposing holes 241 formed therein (see FIG. 26). The holes 241 are positioned so as to substantially align with the holes 240 in the arm portion 230 on a selective basis, as described below.

The holes 241, in conjunction with the holes 240 formed in the arm portion 230, facilitate adjustment of the relative positions of the arm portion 230 and the boom portion 232. In other words, the holes 240, 241 permit the overall span of the lifting arm assembly 206 to be adjusted. In particular, the boom portion 232 can be moved into or out of the arm portion 230. The holes 241 can be aligned with a corresponding pair of the holes 240 when the boom portion 232 is at or near a desired position in relation to the arm portion 230. A clevis pin 243 can be inserted through the aligned holes 240, 241 to secure the boom portion 232 in relation to the arm portion 230 (see FIG. 23). The clevis pin 243 can be retained in the holes 240, 241 using, for example, a cotter pin (not shown).

Figure 28A:
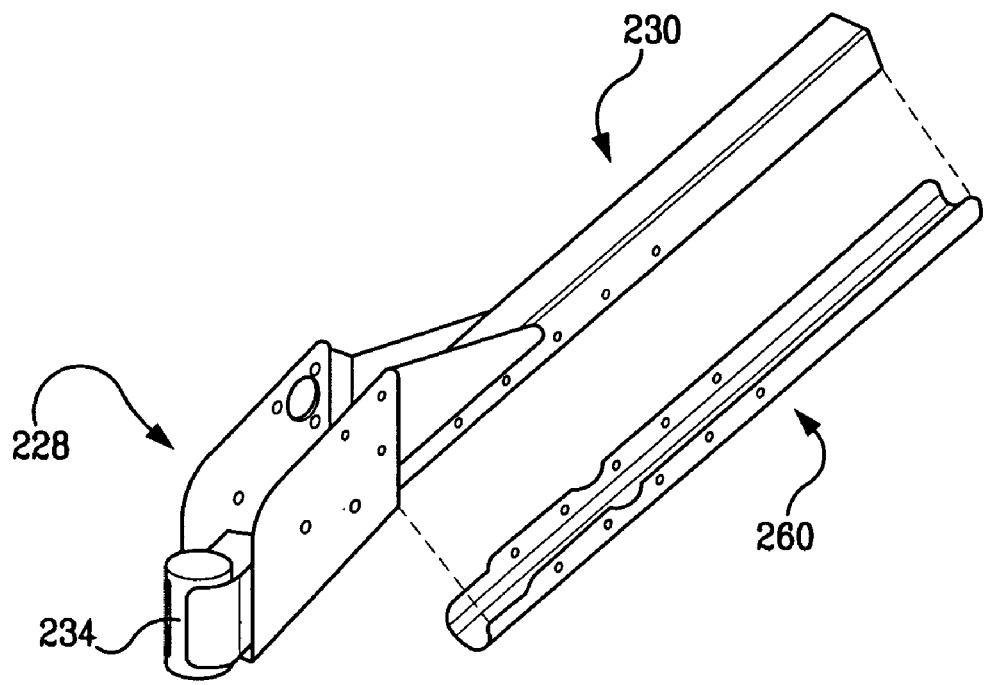
FIG. 28A is a partially-exploded view of the mounting portion shown in FIGS. 27A and 27B, and an alternative embodiment of the arm portion shown in FIGS. 27A and 27B.
Figure 28B:
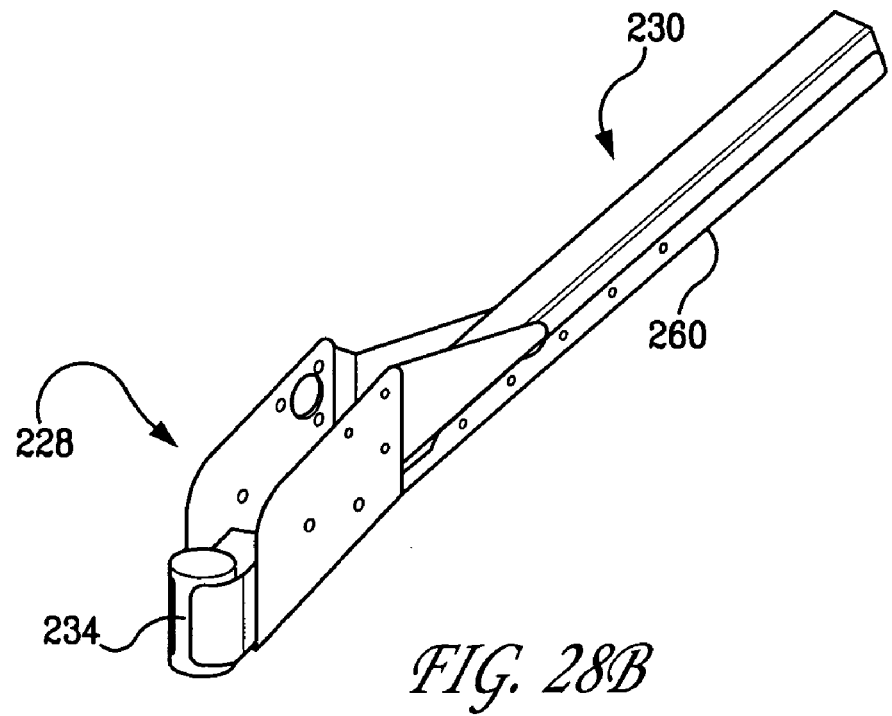
FIG. 28B is perspective view of the mounting portion shown in FIGS. 27A-28A, and the arm portion shown in FIG. 28A.
Figure 29:
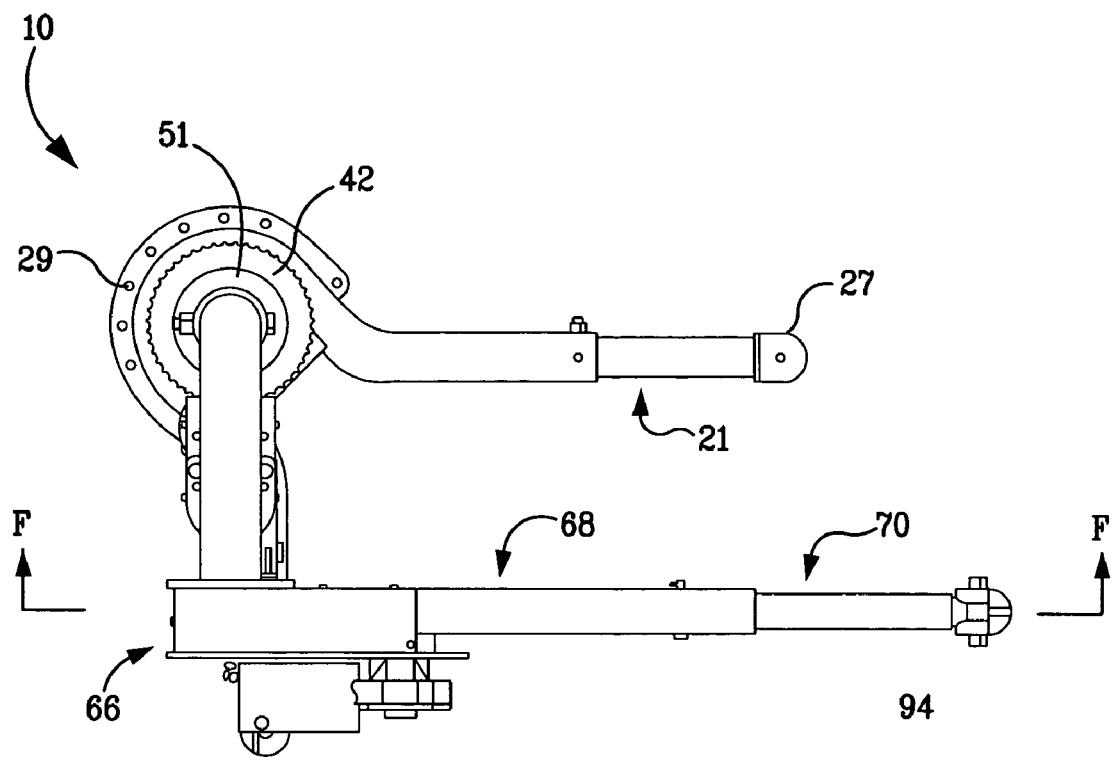
FIG. 29 is a top view of the lifting device shown in FIGS. 1-5, with a cover of a drive assembly thereof removed.

The arm portion 230 can optionally be strengthened by securing a reinforcing bracket 260 thereto, as depicted in FIGS. 28A and 28B.

The lifting arm assembly 16 also comprises a lifting strap 242 and an actuator mechanism 244. The actuator mechanism 242, as explained below, retracts and extends the lifting strap 242 into and out of the boom portion 232 to lift or lower the personal transportation vehicle. The lifting strap 242 translates along, and is supported by, a spool 243 rotatably coupled to the boom portion 232 proximate an end thereof.

The lifting strap 242 can be formed from a suitable material, e.g., nylon, having a tensile strength commensurate with the lifting capacity of the lifting device 200. A lifting hook such as the above-noted lifting hook 92 is secured to a first end of the lifting strap 242. The lifting hook 92 engages a suitable lifting point on the personal transportation vehicle.

Figure 25:
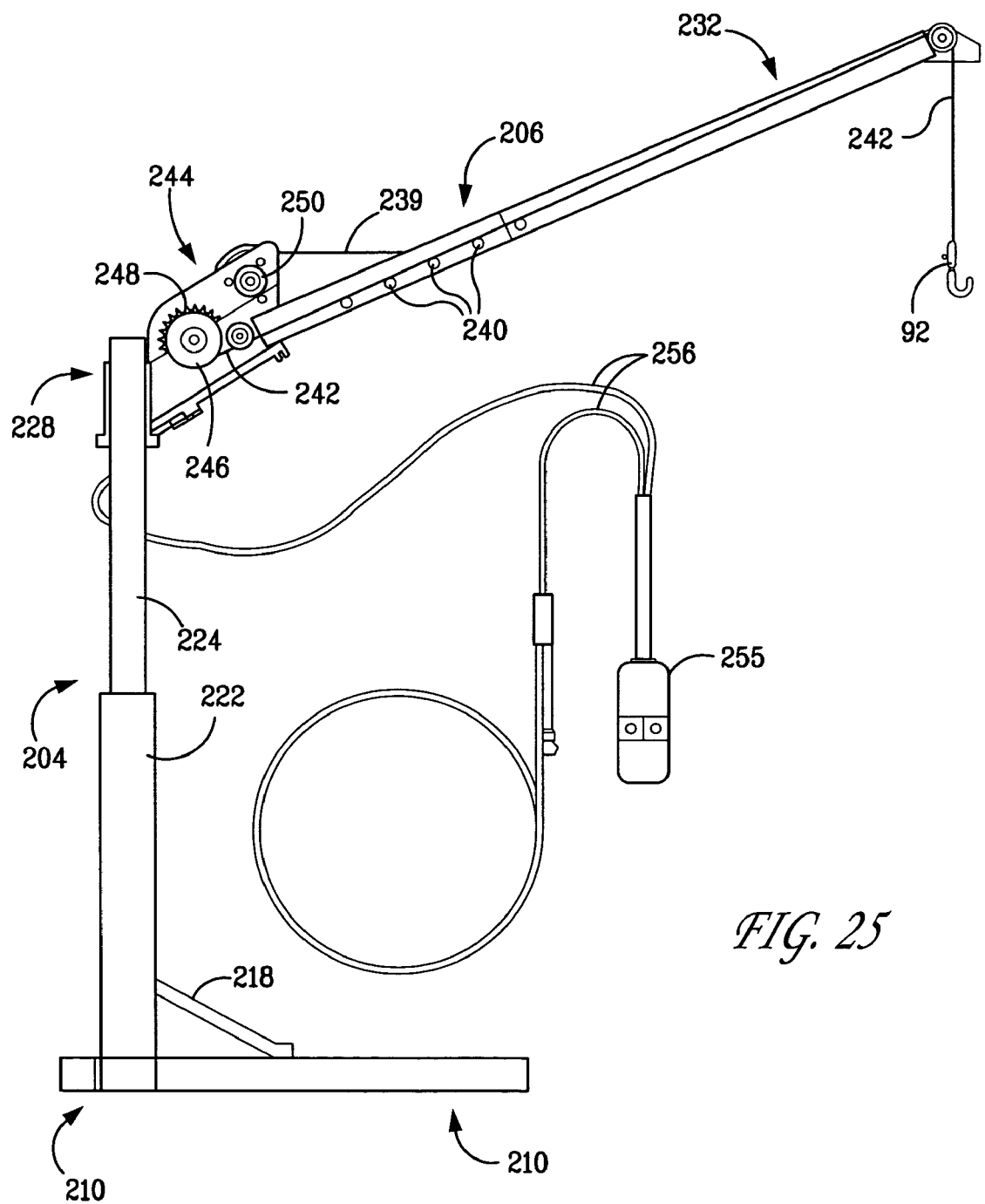
FIG. 25 is a side view of the lifting device shown in FIG. 23, with a side member of a mounting portion of the lifting device removed.
Figure 26:
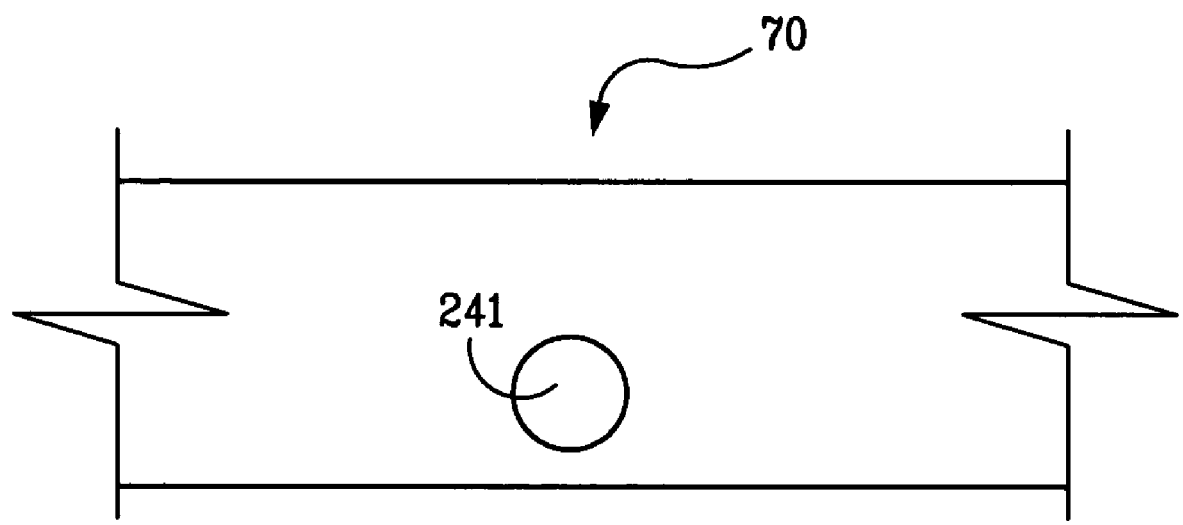
FIG. 26 is a side view of a portion of a boom member of the lifting device shown in FIGS. 23 and 25.

The actuator mechanism 244 is preferably mounted on the second side member 236b of the mounting portion 228, as shown in FIGS. 23-25. It is believed that mounting the actuator mechanism 244 in this location, instead of on the boom portion 232, allows the boom portion 232 to be sized smaller than would otherwise be possible. Moreover, mounting the actuator mechanism 244 at the noted location, rather than underneath the mounting 228, is believed to minimize the potential for interference between the actuator mechanism 244 and the personal transportation device (or other objects in proximity to the lifting device 200).

The actuator mechanism 244 comprises a spool 246, and a first sprocket 248 fixedly coupled to the spool 246 (see FIG. 25). The actuator mechanism 244 also comprises an electric motor 252, and a second sprocket 254 mechanically coupled to the motor 252. Activation of the motor 252 rotates the second sprocket 254. The second sprocket 254 is mechanically coupled to the first sprocket 248 by way of a chain (not shown) so that activation of the motor 252 causes the first sprocket 248 (and the spool 246) to rotate.

The motor 252 is preferably activated and deactivated by the user through the use of a pushbutton control unit 255 electrically coupled to the motor 252 by wiring 256 (see FIG. 25). The control unit 255 can be electrically coupled to the motor 252 by other means, such as an infrared or radio communication link, in alternative embodiments.

A second end of the lifting strap 242 is fixedly coupled to the spool 246. Rotation of the spool 246 in a first direction causes the lifting strap 242 to wind onto the spool 246, thereby raising the lifting hook 92 (and the personal transportation vehicle). Rotation of the spool 246 in a second direction causes the lifting strap 242 to unwind from the spool 246, thereby lowering the lifting hook 92 (and the personal transportation vehicle).

A hood such as the hood 101 can be mechanically coupled to an end of the boom portion 232. Interference between the strap stop 92*a* of the hook 92 and the hood 101 can prevent the hook 92 from being inadvertently drawn into the boom portion 232, as described above in relation to the lifting device 10.

The lifting device 200 comprises a restraining bar 258 (see FIG. 23). The hook 92 can be engaged with the restraining bar 256, and the strap 242 can be retracted so as to place the strap 242 in tension. This arrangement inhibits lifting arm assembly 206 from pivoting about the centerline of the second column 224, and can thus be used, for example, when the lifting device 200 is being transported.

The position of the clevis pin 243 within the arm portion 230 and the boom portion 232 is believed to protect the lifting strap 90 from premature wear. In particular, the holes 240 are formed in the arm portion 230 below the centerline C2 thereof, and the holes 241 in the boom portion 232 are positioned so as to substantially align with the holes 240 on a selective basis, as previously described. These features cause the lifting strap 90 to be positioned above the clevis pin 243. Positioning the lifting strap 90 and the clevis pin 243 in this manner is believed to minimize the potential for the lifting strap 90 to contact the clevis pin 243 (and thereby wear) as the lifting strap 90 is wound onto and off of the spool 246.

PARTS LIST

Lifting device 10
Base assembly 11
Floorboard of transporting vehicle 12
Mounting column assembly 14
Lifting arm assembly 16
Intermediate portion 20 (of base assembly 11) 21
First leg 21 (of base assembly 11)
Second leg 22
First portion 21*a* (of first leg 21)
Second portion 21*b*
First portion 22*a* (of first leg 22)
Second portion 22*b*
Holes 23 (in first portion 21*a*)
Holes 24 (in second portion 21*b*)
Fastener 25 (for securing first and second portions 21*a*, 21*b*)
Bolt 25*a* (of fastener 25)
Washer 25*b*
Nut 25*c*
First collar 26 (of mounting column assembly 14)
Flanges 27 (on second portions 21*b*, 22*b*)
Plate 29 (on intermediate portion 20)
Drive assembly 30 (of mounting column assembly 14)
Column 32 (of drive assembly 30)
Curved portion 32*a*
First major portion 32*b*
Second major portion 32*c*
Arrow 34 denoting direction of travel of column 32
Motor sprocket 35 (of drive assembly 30)
First sprocket 36
Motor 38 (of drive assembly 30)
Supporting structure 39
Sleeve 39*a*
Bracket 39*b*
Second sprocket 40
Wiring 41 (for motor 38)
Third sprocket 42
Holes 43 (in second collar 44)
Second collar 44
Holes 45 (in column 32)
Bushings 46
Fastener 47 (to secure column 32 to second collar 44)
Pin 48 (of drive assembly 30)
Spring 49
Bracket 50 (for pin 48 and spring 49)
Flange 51 (on third sprocket 42)
Set screws 52
Limit switch 53
Bolt 54
Bracket 55 (for limit switch 53 and set screw 54)
Nut 56
Cover 57 (for first and second sprockets 40, 42)
Fasteners 58 (for collar 39*a*)
Bracket 59 (on column 32)
Holes 60 in bracket 57
Weld nuts 61 (on bracket 55)
Bearing surface 62 (within first collar 26)
Mounting portion 66 of lifting arm assembly 16
Arm portion 68
Boom portion 70
First portion 70*a*
Second portion 70*b*
First and second side members 72*a*, 72*b* (of mounting portion 66)
Holes 74 in side members 72*a*, 72*b*
Retaining member 78
Fastener 80 (for retaining member 78)
Holes 82 (in first and second side members 72*a*, 72*b*)
Holes 83 (in arm portion 68)
Notches 84 (in second portion 70*b* of boom arm 70)
Clevis pin 86 (for insertion through holes 83 and notches 84)
Cotter pin 88 (for use with clevis pin 86)
Lifting strap 90
Actuator mechanism 92 (of lifting arm assembly 16)
Spool 91 (in boom portion 70)
Lifting hook 92
Strap stop 92*a*
Spool 94 (of actuator mechanism 92)
First sprocket 96
Motor 98
Wiring 99 (for motor 98)
Second sprocket 100
Hood 101 (of boom portion 70)
Clevis pin 104 (for insertion through holes 60, 82)
Cotter pin 106
Holes 108 (in bracket 59)
Holes 110 (in first and second side members 72*a*, 72*b*)
Lifting arm assembly 120
First portion 122
Lip 122*a*
Second portion 124
Actuator mechanism 126
Mating features 128 (of second portion 124)
Mating features 130 (of first portion 122)
Motor 132 (of actuator mechanism 126)
Drive train 133
Rod 134 (of drive train 133)
Column 140
Curved portion 140*a*
Major portion 140*b*
Curved portion 140*c*

Substantially straight portion 140d
Substantially straight portion 140e
Lifting device 200
Base assembly 202
Mounting column assembly 204
Lifting arm assembly 206
First leg 208 (of base assembly 202)
First portion 208a (of leg 208)
Second portion 208b
Second leg 210
First portion 210a (of leg 210)
Second portion 210b
Holes 212 (in first portion 210a)
Holes 214 (in second portion 210b)
Fastener 216 (for securing first and second portions 208a, 208b)
First and second braces 118 (of base assembly 202)
Plate 220
First column 222
Second column 224
Inner sleeve 225
Arrow 226 denoting direction of travel of second column 224
Mounting portion 228
Arm portion 230
Boom portion 232
Collar 234 (of mounting portion 228)
Split collar 235 (mounting column assembly 204)
First member 236a
Second side member 236b
First and a second brackets 239
Holes 240 (in arm portion 230)
Holes 241 (in boom portion 232)
Lifting strap 242
Clevis pin 243 (for insertion through holes 240, 241)
Actuator mechanism 244
Spool 246 (of actuator mechanism 244)
First sprocket 248
Electric motor 252
Second sprocket 254
Pushbutton control unit 255
Wiring 256 (for pushbutton control unit 254)
Restraining bar 258
Reinforcing bracket 260 (of arm portion 230)
Lifting device 300
Ring collar 302

What is claimed is:

1. A device for lifting a personal-transportation vehicle, comprising:

a base capable of being mounted on a mounting surface;
a column rotatably mounted on the base, the column having a first portion extending in a first direction, and a second portion extending in a second direction substantially perpendicular to the first direction;
a motor for rotating the column in relation to the base;
an arm rotatably mounted on the second portion of the column;
a strap mounted on the arm for suspending the personal-transportation vehicle from the arm, wherein the strap can extend into and out of the arm to lift and lower the personal-transportation vehicle;
a first collar mounted on the base;
a second collar, at least a portion of the second collar being rotatably disposed within the first collar, wherein the column is coupled to the second collar by a pin, the second collar having a pair of diametrically-opposed holes formed therein for receiving the pin, and the column having multiple pairs of diametrically-opposed holes formed therein for receiving the pin, the multiple pairs of diametrically-opposed holes being vertically spaced so that a height of the column can be adjusted in relation to the second collar; and
a sleeve disposed around the first collar and to the first collar by a fastner, wherein the sleeve is rotatable in relation to the first collar while the sleeve is mounted on the first collar so that an angular position of the sleeve in relation to the first collar can be changed while the sleeve is mounted on the first collar, the motor is mounted on the sleeve, and the first collar has multiple pairs of diametrically opposed holes formed therein for receiving the fastner so that a position of the motor can be adjusted in relation to the first collar to accomodate left and right hand installations of the device.

2. The device of claim 1, further comprising a sprocket mechanically coupled to the motor so that the motor rotates the sprocket, and a pin mounted on the second collar so that the pin extends in a substantially vertical direction, the pin being movable substantially in the vertical direction between a first position wherein the pin engages the sprocket so that torque is transferred between the second collar and the sprocket, and a second position wherein the pin is disengaged from the sprocket.

3. The device of claim 1, further comprising a limit switch fixedly coupled to the first collar and electrically coupled to the motor so that activation of the limit switch causes the motor to deactivate, a bracket mounted on the sprocket, a bolt mounted on the bracket, wherein a position of the bolt in relation to the bracket can be adjusted so that the bolt contacts and activates the limit switch when the column reaches an end of a desired range of travel of the column whereby the motor deactivates when the column reaches the end of the desired range of travel, and a second bracket for interfering with movement of the bolt when column overshoots the desired range of travel.

4. The device of claim 1, further comprising a bracket secured to the second portion of the column and having a plurality of holes formed therein for receiving a pin, the holes being spaced apart in increments of approximately twenty degrees, wherein the arm has a plurality of holes formed therein for receiving the pin so that the pin secures the arm from rotating in relation to the column, the holes in the arm being spaced apart in increments of approximately fifteen degrees so that an angular position of the arm in relation to the column can be fixed in increments of approximately five degrees.

5. The device of claim 1, wherein the first collar and the sleeve are substantially cylindrical.

6. The device of claim 1, wherein a position of the sleeve in relation to the first collar can be adjusted independently of the position of the arm.

7. A device for lifting a personal-transportation vehicle, comprising:

a base capable of being mounted on a mounting surface;
a column rotatably mounted on the base, the column having a first portion extending in a first direction, and a second portion extending in a second direction substantially perpendicular to the first direction;
a motor for rotating the column in relation to the base;
an arm rotatably mounted on the second portion of the column;
a strap mounted on the arm for suspending the personal-transportation vehicle from the arm, wherein the strap can extend into and out of the arm to lift and lower the personal-transportation vehicle;

a first collar mounted on the base;

a second collar, at least a portion of the second collar being rotatably disposed within the first collar, wherein the column is coupled to the second collar by a pin, the second collar having a pair of diametrically-opposed holes formed therein for receiving the pin, and the column having multiple pairs of diametrically-opposed holes formed therein for receiving the pin, the multiple pairs of diametrically-opposed holes being vertically spaced so that a height of the column can be adjusted in relation to the second collar;

a sleeve disposed around the first collar and secured to the first collar by a fastener, wherein the motor is mounted on the sleeve, and the first collar has multiple pairs of diametrically opposed holes formed therein for receiving the fastener so that a position of the motor can be adjusted in relation to the first collar to accommodate left and fight hand installations of the device; and a limit switch fixedly coupled to the first collar and electrically coupled to the motor so that activation of the limit switch causes the motor to deactivate, a bracket mounted on the sprocket, a bolt mounted on the bracket, wherein a position of the bolt in relation to the bracket can be adjusted so that the bolt contacts and activates the limit switch when the column reaches an end of a desired range of travel of the column whereby the motor deactivates when the column reaches the end of the desired range of travel, and a second bracket for interfering with movement of the bolt when column overshoots the desired range of travel.

* * * * *